US007786027B2

(12) United States Patent
Aouad et al.

(10) Patent No.: US 7,786,027 B2
(45) Date of Patent: Aug. 31, 2010

(54) FUNCTIONALIZED SUBSTRATES COMPRISING PERFUME MICROCAPSULES

(75) Inventors: Yousef Georges Aouad, Cincinnati, OH (US); Tania Edmee Berges Cabrera, Cincinnati, OH (US); Lois Jean Boekley, Cincinnati, OH (US); Jodi Lee Brown, Cincinnati, OH (US); Vincenzo Catalfamo, Cincinnati, OH (US); Frank William Denome, Cincinnati, OH (US); Renae Dianna Fossum, Middletown, OH (US); Yonas Gizaw, Cincinnati, OH (US); Errol Hoffman Wahl, Cincinnati, OH (US); Brian Joseph Roselle, Fairfield, OH (US); Michael Bruce Edwards, Springfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 118 days.

(21) Appl. No.: 11/981,378

(22) Filed: Feb. 11, 2008

(65) Prior Publication Data

US 2008/0131695 A1 Jun. 5, 2008

Related U.S. Application Data

(63) Continuation-in-part of application No. 11/800,616, filed on May 7, 2007.

(60) Provisional application No. 60/798,158, filed on May 5, 2006.

(51) Int. Cl.
*B32B 27/12* (2006.01)
*B32B 27/04* (2006.01)

(52) U.S. Cl. .......................... 442/59; 442/96; 428/40.2; 428/323; 428/402

(58) Field of Classification Search .................. 442/96, 442/59; 428/40.2, 323, 402
See application file for complete search history.

(56) References Cited

U.S. PATENT DOCUMENTS

| | | | | |
|---|---|---|---|---|
| 3,936,538 | A | 2/1976 | Marshall et al. | |
| 4,842,761 | A | 6/1989 | Rutherford | |
| 6,362,159 | B1 * | 3/2002 | Aguadisch et al. | 512/4 |
| 6,426,055 | B1 | 7/2002 | Shefer et al. | |
| 6,682,756 | B1 | 1/2004 | Horstmann et al. | |
| 7,015,186 | B2 | 3/2006 | Aussant et al. | |
| 7,049,274 | B2 | 5/2006 | Ranade et al. | |
| 7,166,566 | B2 | 1/2007 | Mangin et al. | |
| 2002/0151236 | A1 | 10/2002 | Zolotarsky et al. | |
| 2005/0226826 | A1 | 10/2005 | Eason et al. | |
| 2006/0019866 | A1 | 1/2006 | Briggs et al. | |
| 2007/0148213 | A1 | 6/2007 | Ibrahim et al. | |

FOREIGN PATENT DOCUMENTS

| | | | |
|---|---|---|---|
| EP | 1 275 368 | A1 | 1/2003 |
| EP | 1735426 | B1 | 9/2008 |
| JP | 59-186912 | A | 10/1984 |
| WO | WO 94/02377 | | 2/1994 |
| WO | WO 2004/020566 | A1 | 3/2004 |
| WO | WO2008040620 | A1 | 4/2008 |

* cited by examiner

*Primary Examiner*—Ula C Ruddock
(74) *Attorney, Agent, or Firm*—Gary J. Foose; Ronald T. Sia

(57) ABSTRACT

A functionalized substrate comprising: from about 1% to about 20% of a water-dispersible and/or a water-disintegrating material comprising a cellulose by weight; from about 0.001% to about 50% of a binder material by weight; and a plurality of microcapsules encapsulating at least one functional material, wherein said plurality of microcapsules is incorporated with said functionalized substrate.

7 Claims, 1 Drawing Sheet

FUNCTIONALIZED SUBSTRATES COMPRISING PERFUME MICROCAPSULES

CROSS REFERENCE TO RELATED APPLICATIONS

This application is a continuation-in-part of U.S. patent application Ser. No. 11/800,616 filed on May 7, 2007, which claims priority to U.S. Pat. application Ser. No. 60/798,158 filed on May 5, 2006, the disclosures of which are hereby incorporated by reference.

BACKGROUND OF THE INVENTION

The home laundering process provides consumers with the opportunity to treat fabrics with a multitude of materials which can impart desirable benefits to the fabrics during the wash and/or rinse cycle. Scent experience is one of these desired benefits.

Conventional laundering products provide limited scent options based on what is provided in commercially available detergents and fabric softeners. As such, many consumers are unable to find the proper combination of detergents and/or softeners to meet their needs. There remains a need to provide consumers with new ways to customize their scent experiences without being limited to scents or perfumes available in detergents and fabric softeners.

Additionally, conventional laundering products are marketed with certain amounts of perfume. As such, consumers cannot easily vary the scent intensity without resorting to overdosing or underdosing their detergent and/or fabric softener. One problem with controlling scent intensity by overdosing and underdosing is that varying from the recommended dosage can lead to fabric damage and or insufficient cleansing or softening. As such, there remains a need for new ways to allow consumers to control the intensity of their scent experience.

Further, despite the ability of the conventional laundering products to impart perfume and scent to fabrics during the laundering process, the scent tends to fade after time. As such, there remains a need for a product which can also provide scent longevity to fabrics after laundering.

Additionally, there is a need for a versatile product which is capable of addressing the above mentioned needs and also capable of releasing perfume into the air. Conventional air fresheners provide perfume into the air while conventional laundering products provide fabric laundering benefits. There remains a need for a single article which is versatile such that the article provides air freshening benefits when exposed to ambient air and provides consumers with a scent experience when used in the laundering process.

SUMMARY OF THE INVENTION

In one aspect of the present invention, there is provided a functionalized substrate comprising: from about 1% to about 20% of a water-dispersible and/or a water-disintegrating material comprising a cellulose by weight; from about 0.001% to about 50% of a binder material by weight; and a plurality of microcapsules encapsulating at least on functional material, wherein said plurality of microcapsules is incorporated with said functionalized substrate.

BRIEF DESCRIPTION OF THE DRAWINGS

FIG. I provides a perspective view of suitable shape for a functionalized substrate in accordance with one embodiment of the present invention.

DETAILED DESCRIPTION OF THE INVENTION

Figure 1:
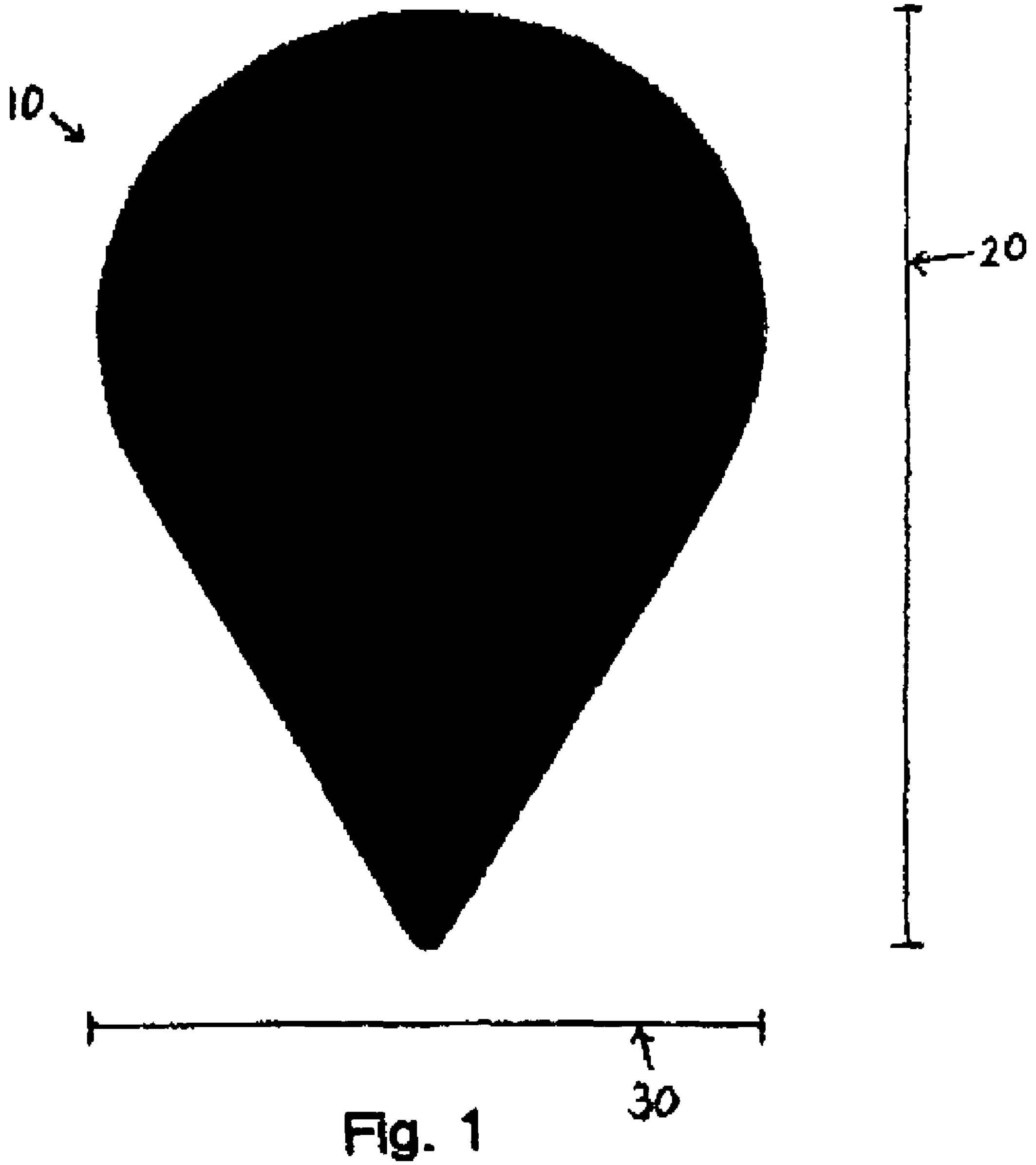

It has surprisingly been found that functionalized substrates according to the present invention are capable of a total perfume loading level of from about 1% to about 95% by weight of said functionalized substrate, wherein said total perfume loading level is the total amount of perfume which is present in the functionalized substrate and/or encapsulated in microcapsules incorporated with the functionalized substrate. It has been found that these functionalized substrates are useful for dispersing perfume and other functional materials into aqueous solutions, e.g. in laundry and/or dishwashing applications, and/or for prolonged dispersal of perfume in ambient air. It is believed that the synergies between the elements of the invention surprisingly provide multiple benefits including: rapid dissolution in an aqueous solution and prolonged dispersal in ambient air. Further, it is believed that the use of perfume microcapsules provide for scent longevity because the microcapsules release the encapsulated perfume upon rupturing.

It has further surprisingly been found that a functionalized substrate comprising: from about 1% to about 20% of a water-dispersible and/or a water-disintegrating material comprising a cellulose by weight; from about 0.001% to about 50% of a binder material by weight; and a plurality of microcapsules encapsulating at least one functional material, wherein said plurality of microcapsules is incorporated with said functionalized substrate provides for a highly versatile and effective form of delivery encapsulated perfume in the laundering process as well as other uses.

1. Functionalized Substrate

According to one aspect of the invention, there is provided a functionalized substrate comprising a composition susceptible to aqueous attack and a plurality of microcapsules encapsulating a functional composition, wherein the plurality of microcapsules is incorporated with the functionalized substrate. As used herein, incorporated with the functionalized substrate means that the plurality of microcapsules are in the functionalized substrate, touching the surface of the functionalized substrate, at least partially on the surface of the functionalized substrate, or otherwise connected to the functionalized substrate. In another embodiment, the plurality of microcapsules is dispersed throughout the functionalized substrate. In yet another embodiment, the plurality of microcapsules is uniformly dispersed throughout the functionalized substrate. In yet another embodiment, the plurality of microcapsules is dispersed in a discrete area or areas of the functionalized substrate.

a. Aqueous Attack

The functionalized substrate according to the present invention comprises a composition which is susceptible to aqueous attack. As used herein, aqueous attack means that the composition when contacted with an aqueous solution dissolves, deforms, disintegrates, solubilizes, or otherwise undergoes physical degradation. The term "aqueous solution" should be broadly interpreted for the purpose of this invention, including any mixture comprising water. In one embodiment, the water content of the aqueous solution is at least about 10%, alternatively at least 20%, alternatively at least about 30%, alternatively at least about 40%, alternatively even greater than about 99% by weight of the aqueous solution. In another embodiment, the aqueous solution comprises one or more functional materials. In another embodiment the aqueous solution is a water bath in which a detergent, fabric softener, or fabric treatment product has been added. In yet another embodiment, the aqueous solution comprises slurries and dispersions (liquid/solid), foams (liquid-gas), gels, and emulsions (liquid/liquid) and mixtures thereof.

b. Compositions Susceptible to Aqueous Attack

In one embodiment, the composition susceptible to aqueous attack comprises water-soluble materials, partially water-soluble materials, water-dispersible materials, water-disintegrating materials, and mixtures thereof.

1. Water-Soluble and Partially Water-Soluble Materials

In one embodiment of the present invention, the composition susceptible to aqueous attack comprises a water-soluble or partially water-soluble material. As used herein, water-soluble materials include partially water-soluble materials. Where a water-soluble material is used, the water-soluble material has a water-solubility of at least 50%, alternatively at least 75%, or even at least 95%, as measured by the Gravimetric Method as defined in U.S. Pat. No. 7,166,566 to Mangin et al. at col. 3, lines 46-65. The water-soluble material of the present invention comprises a water-soluble polymeric material, a fatty acid or a soap of a fatty acid, and mixtures thereof.

Suitable water-soluble materials include water-soluble polymeric materials (polymers) which can be formed into a film or sheet or laminate or extruded (or pressed into a 3-dimensional shape) or blown into a film or foam. In one embodiment, the level of polymer in the functionalized substrate is at least about 5% by weight of said functionalize substrate. In another embodiment, the level of polymer is from about 10% to about 99%, alternatively from about 15% to about 95%, alternatively from about 20% to about 90%, by weight of said functionalized substrate. Films formed of polymers can be obtained by casting, blow-molding, extrusion or blown extrusion of the polymeric material, as known in the art. Non-limiting examples of polymer foams and methods of forming such foams are disclosed in U.S. Pat. No. 7,056,877.

Examples of polymers, copolymers or derivatives thereof suitable for use as water-soluble material include but are not limited to polyvinyl alcohols (PVA), modified PVAs; polyvinyl pyrrolidone; PVA copolymers such as PVA/polyvinyl pyrrolidone and PVA/ polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the polymer comprises PVA; PVA copolymers; hydroxypropyl methyl cellulose (HPMC); and mixtures thereof.

Where the composition comprises PVA, the functionalized substrate comprises a rapid dissolution rate, as defined herein, where the functionalized substrate at least partially dissolves in an aqueous solution at cold temperatures, i.e., less than about 40° F. or 50° F. during the wash cycle and/or the rinse cycle. Typical normal wash and/or rinse cycles with an upright machine should take about 10 to about 12 minutes, alternatively about 5 minutes. In one embodiment, the entire functionalized substrate dissolves in during the wash and/or rinse cycles. In one embodiment, PVA is mixed or blended with another polymer to obtain the desired dissolution rate. It is believed that selecting polymers based on average molecular weight and/or degree of hydrolysis allows for different dissolution rates.

In one embodiment, the composition comprises a combination or mixture of more than one of PVA resins. Suitable mixtures and/or blends of more than one PVA are provided in U.S. patent application Ser. No. 11/800,616 at pages 6-8 and U.S. Pat. No. 6,757,512 to Verall et al. col. 4, line 4-col. 6, line 25.

In another embodiment, the water soluble material comprises at least one polymer further comprising a polyethylene glycol (PEG). In one embodiment, the functionalized substrate comprises from about 50% to about 90%, alternatively from about 55% to about 85%, alternatively from about 65% to about 80% of PEG, by weight.

Non-limiting examples of suitable polyethylene glycols include polyethylene glycol 4000, polyethylene glycol 8000, and mixtures thereof. Where a polyethylene glycol is used, the weight ratio of polyethylene glycol to the encapsulated functional material is dependant upon the type of polyethylene glycol and its molecular weight. In one embodiment, the weight ratio of polyethylene glycol to encapsulated functional material is from about 9:1 to 1:9, alternatively from about 5:1 to about 1:5.

Another suitable water-soluble material includes a fatty acid or a soap of a fatty acid. The term "fatty acid" is used herein in the broadest sense to include unprotonated or protonated forms of a fatty acid; and includes fatty acid that is bound or unbound to another chemical moiety as well as the various combinations of these species of fatty acid. One skilled in the art will readily appreciate that the pH of an aqueous composition will dictate, in part, whether a fatty acid is protonated or unprotonated. In another embodiment, the fatty acid is in its unprotonated, or salt form, together with a counter ion, such as, but not limited to, calcium, magnesium, sodium, potassium and the like. The term "free fatty acid" means a fatty acid that is not bound (to another chemical moiety (covalently or otherwise) to another chemical moiety. In another embodiment, the fatty acid is in its soap form. In another embodiment, the fatty acid in free or soap form is combined with a starch or a starch derivative.

In one embodiment, the fatty acid may include those containing from about 12 to about 25, alternatively from about 13 to about 22, alternatively from about 16 to about 20, total carbon atoms, with the fatty moiety containing from about 10 to about 22, alternatively from about 12 to about 18, alternatively from about 14 (mid-cut) to about 18, carbon atoms.

The fatty acid or soap where present is at a concentration from about 10%, alternatively from about 20%, alternatively from about 40%, alternatively from about 60%, alternatively from about 70% to about 95%, alternatively to about 90% by weight of the functionalized substrate.

In another embodiment the fatty acid can act as fabric softening active. While not to be bound by theory, it is believed that fatty acid can deposit in the wash cycle to lubricate fabric fibers and give a soft fabric feel benefit. It also believed that the fatty acid can complex with hardness ions, principally calcium and magnesium ions, in the wash cycle to form a soap complex which is then deposited onto the fabrics.

Suitable fatty acids are those derived from (1) animal fat and/or a partially hydrogenated animal fat, i.e. beef tallow, lard, etc.; (2) vegetable oil, and/or partially hydrogenated vegetable oil, i.e. canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, i.e. linseed oil or tung oil via thermal, pressure, alkali-isomerization and catalytic treatments; and (4) mixtures thereof, to yield saturated (e.g. stearic acid), unsaturated (e.g. oleic acid), polyunsaturated (linoleic acid), branched (e.g. isostearic acid) or cyclic (e.g. saturated or unsaturated a disubstituted cyclopentyl or cyclohexyl derivatives of polyunsaturated acids) fatty acids. Non-limiting examples of fatty acids (FA) are listed in U.S. Pat. No. 5,759,990 at col 4, lines 45-66.

2. Water-Dispersible Materials and Water-Disintegrating Materials.

In another embodiment, the composition susceptible to aqueous attack comprises a water-dispersible material. Non-limiting examples of such water-dispersible materials include those disclosed in U.S. Pat. Publ. No. 2006/0293419 A1, published Dec. 28, 2006, U.S. Pat. No. 7,094,817, published Apr. 22, 2006, WO 0131103 A3, published May 3, 2001, U.S. Pat. No. 6,211,309, published Apr. 3, 2001, and U.S. Pat. No. 5,224,601, published Jul. 6, 1993.

In yet another embodiment, the composition susceptible to aqueous attack comprises a water-disintegrating material. Non-limiting examples of such water disintegrating materials include those disclosed in Japanese Pat. Nos. 3525174 (Japanese Pat. Appl. No. H09-279457) and Japanese Pat. Appl. No. H10-008364, both assigned to Chisso Corp of Japan.

As used herein, water-dispersible materials include water-disintegrating materials. In one embodiment, the functionalized substrate comprises a water-dispersible material comprising a cellulose. Where cellulose is present in the functionalized substrate, the weight ratio of encapsulated functional material to cellulose is from about 1:0.05 to about 1:1, alternatively from about 1:0.1 to about 1:0.5. One example is the dispersible paper material as supplied by Mishima, Japan. Non-limiting example of suitable celluloses include those disclosed in U.S. Pat. No. 6,582,720 to Inagi et al., such as ethyl cellulose and cellulose derivative polymers. In another embodiment, the cellulose comprises a cellulose derivative polymer comprising: hydroxypropylmethylcellulose phthalate, hydroxypropylmethylcellulose acetate succinate, carboxymethylethyl cellulose, cellulose acetate trimellitate, cellulose acetate phthalate, and mixtures thereof.

In another embodiment, where a water-dispersible and/or water-disintegrating material is used to form the functionalized substrate, the functionalized substrate further comprises a binder material, as defined below. It has surprisingly been found that the use of the presently disclosed binder materials in combination with the water-dispersible materials and/or water-disintegrating materials of the present invention allow for suitable functionalized substrates with low levels of both ingredients. For example, in one embodiment, the functionalized substrate comprises a) from about 1% to about 20%, alternatively about 5% to about 10%, alternatively about 6% to about 8% of a water dispersible material by weight of said functionalized substrate; and b) from about 0.005% to about 10%, alternatively about 0.001% to about 5%, alternatively about 0.05% to about 2%, alternatively from about 0.1% to about 1% of a binder by weight of said functionalized substrate. In another embodiment, the weight ratio of water-dispersible and/or water-disintegrating material to binder material is from about 100:1 to about 1:1, alternatively from about 80:1 to about 2:1, alternatively from about 70:1 to about 5:1, alternatively from about 50:1 to about 10:1.

In yet another embodiment, the composition susceptible to aqueous attack comprises a water-disintegrating solid matrix such as a clay or other solid carrier material or even water soluble and water dispersible materials such as citric acid, sodium carbonate, and sodium bicarbonate. As non-limiting examples, these can be formed into tablets, disks, spheres, beads, or wrapped in water soluble film as a unit dose. Such forms are disclosed in U.S. Pat. No. 7,056,877, U.S. Pat. Publ. No. 2005/0020476 A1, and WO 02090481 A1.

2. A Plurality of Microcapsules a. Microcapsules

The functionalized substrate of the present invention further comprises a plurality of microcapsules. The term "microcapsule" is used herein the broadest sense and includes the encapsulation of perfume or other materials or actives in small capsules (i.e., microcapsules), typically having a diameter less than about 300 microns. Typically, these microcapsules comprise a spherical hollow shell of water insoluble or at least partially water insoluble material, typically polymer material, within which the active material, such as perfume, is contained. Mixtures of different microcapsules can be used (e.g., microcapsules containing different perfumes and microcapsules containing a fabric care active and/or a skin care active as functional materials). Non-limiting examples of microcapsules are available in the following references: U.S. Pat. Publ. Nos. 2003/215417 A1; 2003/216488 A1; 2003/158344 A1; 2003/165692 A1; 2004/071742 A1; 2004/071746 A1; 2004/072719 A1; 2004/072720 A1; 2003/203829 A1; 2003/195133 A1; 2004/087477 A1; 2004/0106536 A1; EP 1,393,706 A1; U.S. Pat. Nos. 6,645,479; 6,200,949; 4,882,220; 4,917,920; 4,514,461; RE 32,713; and 4,234,627.

In one embodiment, the plurality of microcapsules comprises a friable microcapsule. Friability refers to the propensity of the microcapsules to rupture or break open when subjected to direct external pressures or shear forces. For purposes of the present invention, a microcapsule is "friable" if, while attached to fabrics treated therewith, the microcapsule can be ruptured by the forces encountered when the capsule-containing fabrics are manipulated by being worn or handled (thereby releasing the contents of the capsule). In another embodiment, the plurality of microcapsules comprises a moisture-activated microcapsule such as beta-cyclodextrin. In yet another embodiment, the plurality of microcapsules comprise a heat-activated microcapsule. As defined herein, a heat-activated microcapsule is one that ruptures by body heat and/or by the heat in a machine dryer. In yet another embodiment, the plurality of microcapsules comprises a friable microcapsule, a moisture-activated microcapsule, a heat-activated microcapsule, or combinations thereof. Non-limiting examples of additional microcapsules include wax comprising microcapsule such as those described in U.S. Pat. No. 5,246,603 and starch-based microcapsule also described in U.S. Pat. No. 5,246,603.

Microcapsules may be prepared using a range of conventional methods known to those skilled in the art for making shell capsules, such as interfacial polymerization, and polycondensation. See e.g., U.S. Pat. No. 3,516,941, U.S. Pat. No. 4,520,142, U.S. Pat. No. 4,528,226, U.S. Pat. No. 4,681,806, U.S. Pat. No. 4,145,184; GB 2,073,132; WO 99/17871; and MICROENCAPSULATION: Methods and Industrial Applications Edited by Benita and Simon (Marcel Dekker, Inc. 1996). It is recognized, however, that many variations with regard to materials and process steps are possible. Non-limiting examples of materials suitable for making shell of the microcapsule include urea-formaldehyde, melamine-formaldehyde, phenol-formaldehyde, gelatin, gelatin/gum arabic blend, polyurethane, polyamides, or combinations thereof.

Useful shell materials include materials selected from the group consisting of polyethylenes, polyamides, polystyrenes, polyisoprenes, polycarbonates, polyesters, polyacrylates, polyureas, polyurethanes, polyolefins, polysaccharides, epoxy resins, vinyl polymers, and mixtures thereof. Suitable shell materials include materials selected from the group consisting of reaction products of one or more amines with one or more aldehydes, such as urea cross-linked with formaldehyde or gluteraldehyde, melamine cross-linked with formaldehyde; gelatin-polyphosphate coacervates optionally cross-linked with gluteraldehyde; gelatin-gum Arabic coacervates; cross-linked silicone fluids; polyamine reacted with polyisocyanates and mixtures thereof. In one aspect, the shell material comprises melamine cross-linked with formaldehyde.

In one embodiment, the plurality of microcapsules comprises a mean diameter in the range from about 1 micrometer to about 100 microns, alternatively from about 5 microns to about 80 microns, alternatively from about 10 microns to about 75 microns, and alternatively between about 15 microns to about 50 microns. The particle size distribution can be narrow, broad or multimodal. In another embodiment, the plurality of microcapsules vary in size having a maximum diameter between about 5 microns and about 300 microns, alternatively between about 10 microns and about 200 microns. Without intending to be bound by theory, it is believed that as the microcapsule diameters approach about 300 microns, (e.g. about 250 microns), a reduction in the number of microcapsules entrained in the fabric may be observed. In another embodiment, the plurality of microcapsules comprises an average shell thickness from about 0.02 micron to about 5 microns, alternatively from about 0.02 micron to about 1 micron.

b. Functional Composition

The functionalized substrate of the present invention comprises a plurality of microcapsules encapsulating a functional composition. In one embodiment, the functional composition can also be present in the functionalized substrate, for example where the functionalized substrate comprises perfume microcapsules and free perfume. As used herein, functional composition means a composition which comprises one or more functional materials. As used herein functional material means any material that performs a function or delivers a benefit after dissolution of the functionalized substrate, or which modify the physical or chemical properties of the treated material (e.g. fabric), other than aesthetic appearance. For example inks, decorative dyes and pigments are not considered functional materials. However, a hueing dye for improved whiteness appearance of fabrics is considered a functional material.

The functionalized substrate of the present invention is suitable for loading high levels of functional compositions (including encapsulated functional compositions and free functional compositions). In one embodiment, the functionalized substrate comprises a total functional composition loading level of at least about 1%, alternatively at least about 5%, alternatively at least about 10%, alternatively at least about 25%, and alternatively at least about 50%, alternatively at least 80% to about 95%, alternatively to about 90%, alternatively to about 80%, alternatively to about 75% by weight.

In another embodiment, a coating of a functional composition can be applied to a functional substrate already containing microcapsules. The coating can contain the same or different microcapsules. Non-limiting examples of suitable coatings are disclosed in U.S. patent application Ser. No. 60/798,158 to Wahl et al.

The functional composition comprises one or more functional materials.

Suitable functional materials, including, but not limited to: flavors, perfumes, softening agents, anti-static agents, crisping agents, water/stain repellents, stain release agents, refreshing agents, anti-microbial agents, disinfecting agents, wrinkle resistant agents, wrinkle release agents, odor resistance agents, malodor control agents, abrasion resistance and protection agents, solvents, insect/pet repellents, wetting agents, UV protection agents, skin/fabric conditioning agents, skin/fabric nurturing agents, skin/fabric hydrating agents, color protection agents, dye fixatives, dye transfer inhibiting agents, silicones, preservatives and anti-microbials, fabric shrinkage-reducing agents, perfume microcapsules, brighteners, hueing dyes, bleaches, chelants, antifoams, anti-scum agents, whitening agents, catalysts, cyclodextrin, zeolite, petrolatum, glycerin, triglycerides, vitamins, other skin care actives such as aloe vera, chamomile, shea butter and the like, mineral oils, and combinations thereof. Microcapsules encapsulating these and other commonly used functional materials can be used in accordance with the present invention.

In another embodiment, the functional material comprises a perfume raw material, silicone oils and silicone waxes, waxes, hydrocarbons, paraffins, isoparaffins (e.g., Permethyls available from Chesham Specialty Ingredients LTD), higher fatty acids, essential oils, lipids, skin coolants, vitamins, sunscreens, antioxidants, glycerin, catalysts, bleaches and bleach particles, bleach activators, bleach catalysts, soil suspending polymers, wetting agents, silicon dioxide particles, malodor reducing agents, dyes, brighteners, antibacterial actives, antiperspirant actives, cationic polymers, polydimethylsiloxane (PDMS or derivatized PDMS; one example is silicone polyethers), aminofunctional silicones, sucrose polyesters, polyglycerol esters, polyethylene waxes, vitamin E, niacinamide, enzymes, amino acids, shea butter, aloe vera, petrolatum, retinol, cucumber extracts, chamomile extracts, almond milk, silk protein, keratin protein and keratin amino acids, natural soap, eucalyptus, natural oat, sea minerals, lavender, rose, vanilla extract, linen flower, hibiscus, citrus, lemon, lime, orange, and mixtures thereof.

Other suitable functional materials include laundry cleaning actives, barrier agents, solubility modifiers, fabric softening actives including cationic surfactants, quaternary ammonium compounds, antistatic actives, silicones, antifoams and mixtures thereof. Other functional materials are disclosed in U.S. Pat. No. 7,056,877 and are included by reference.

c. Perfume Microcapsules (PMC)

In one embodiment, the functional material comprises a perfume. Non-limiting examples of suitable perfumes include blooming perfumes, perfume oils, and perfume raw materials comprising alcohols, ketones, aldehydes, esters, ethers, nitriles alkenes, and mixtures thereof.

In one embodiment, where the functionalized substrate comprises at least one PMC and a free perfume (discussed below), the perfume encapsulated in said PMC and said free perfume provide a total perfume loading level of from about 1% to about 95% by weight of said functionalized substrate, alternatively from about 5% to about 90%, alternatively from about 10% to about 80%, alternatively from about 20% to about 70%, alternatively from about 30% to about 60%. As used herein, total perfume loading means the total amount of perfume including any free perfume within the functionalized substrate and/or any perfume encapsulated within said microcapsules.

In another embodiment, the perfume loading level of the encapsulated perfume ("PMC loading level") is from about 1% to about 80%, alternatively from about 10% to about 70%, alternatively from about 20% to 60%, alternatively from about 30% to about 50%, by weight of the functionalized substrate. In another embodiment, where the functionalized substrate comprises a functional composition comprising more than one functional material, wherein one of said more than one functional materials comprises an encapsulated perfume (PMC), the PMC loading level of from about 1% to about 95%, alternatively from about 5% to about 90%, alternatively from about 20% to about 80%, alternatively from about 35% to about 75%, alternatively from about 50% to about 75%, by weight of the functional composition.

It is believed that this technology provides sufficient loading capability versus other technologies, such as beta-cyclodextrin. It is further believed that advantages may include, but are not limited to, one or more of the following: (i) the ability to use a reduced total perfume level, e.g., in neat perfume directly added; in perfume microcapsules; or combinations thereof; (ii) avoiding cost in processing and lost material through processing; (iii) delivering a high level of perfume while not affecting process product disposition or process parameters or product stability or product physical properties (one example is viscosity); and (iv) delivering a high level of perfume to fabric while avoiding a high level of neat product odor, which can be a consumer negative; (v) delivering improved fabric odor longevity performance compared to neat perfume; and (vi) delivering improved odor from fabrics under stress conditions (one example is while wearing clothing during physical activity or exercise).

Another aspect of the invention provides a functional composition comprising a perfume composition comprising at least one of the following: (a) perfume microcapsule comprising a perfume carrier and an encapsulated perfume composition, wherein said perfume microcapsule is selected from a moisture-activated microcapsule, a heat-activated microcapsule, a friable microcapsule, or mixtures or combinations thereof.; (b) a pro-perfume; (c) a low odor detection threshold perfume ingredient; (d) neat perfume; and (e) combinations thereof. In one embodiment, the article is free or substantially free of any one or more of the aforementioned perfume components. Non-limiting examples of a moisture-activated perfume microcapsule includes ones that comprises cyclodextrins or perfume loaded zeolites having particle sizes from about 0.1 microns to about 250 microns, alternatively from about 0.1 microns to about 30 microns, alternatively from about 0.1 microns to about 5 microns. Suitable compositions comprising perfume; hydrating materials, and perfume carrier materials such as perfume loaded zeolites are disclosed in further detail in WO Publ. No. 02/090481 pages 9-19 (disclosing suitable hydrating materials such as effervescing materials and non-effervescing materials); pages 50-63 (discussing perfume entrapped on carrier materials including zeolites).

Examples of suitable microcapsules include Perfume Microcapsules (PMCs) from Appleton of Appleton, Wis., EVERLAST from International Flavors & Fragrances (IFF) of New York, N.Y. and WIZARD from Reed Pacific of Australia.

In one embodiment, the perfume composition comprises a single perfume raw material. In another embodiment, the perfume composition comprises more than one perfume raw material, selected to provide a specific scent experience. In yet another embodiment, the perfume composition comprises a blooming perfume composition. In one embodiment, the blooming perfume composition comprises from about 3 to about 300 different perfume ingredients.

Once friable microcapsules containing a perfume composition of the present invention have been deposited on fabrics being treated, it is necessary to manipulate the treated fabrics in a manner sufficient to rupture the microcapsules and thereby release the perfume composition. Microcapsules of the type utilized herein have friability characteristics such that the ordinary fabric manipulation that occurs when the treated fabrics are worn or used is sufficient for the deposited microcapsules to impart a noticeable odor to the fabric. A significant number of deposited microcapsules can be broken by the normal forces encountered when treated garments are worn. For fabric articles which are not worn, the normal household handling operations such as folding, crumpling etc. can serve as fabric manipulation sufficient to rupture the deposited microcapsules. Even broken or ruptured microcapsules can provide a perfume "sink" wherein the fragrance is slowly released over time and gives longevity of odor on fabric benefit. The perfume composition of the present invention surprisingly maximizes the effect of the microcapsules bursting by providing a perfume composition that "blooms" upon the microcapsules rupturing.

1. Blooming Perfume

The present invention is based, in part, upon the discovery that the blooming perfume compositions of the present invention maximize the opportunity for the consumer of a unique scent experience during the wearing, folding, and even after storage of laundry when fabric deposited with friable microcapsules are ruptured. In one embodiment, the perfume microcapsule encapsulates a blooming perfume composition, wherein the blooming perfume composition, in the absence of water, comprises from about 5% to about 95%, alternatively from about 20% to about 90%; alternatively from about 30% to about 85%, and alternatively from about 40% to about 80%, by the total weight of the perfume microcapsule and the encapsulated perfume composition, also in absence of water.

The term "blooming perfume composition" as used herein means a perfume composition that comprises at least about 10%, alternatively at least about 20%, alternatively at least about 30%, alternatively at least about 40%, alternatively at least about 50%, alternatively at least about 60%, by weight of the perfume composition, of blooming perfume ingredients, wherein the blooming perfume ingredients are those having a boiling point (B.P.) equal to or lower than about 250° C., wherein the B.P. is measured at the normal standard pressure.

Non-limiting examples of blooming perfume ingredients that are useful in the articles of the present invention are given in U.S. Pat. Pub. No. 2005/0192207 A1 at ¶¶29-31 (disclosing suitable blooming perfume ingredients) and ¶36 (disclosing substantive perfume ingredients having a B.P. higher than about 250° C.); and U.S. patent application Ser. No. 11/800,616 pages 13-15.

In one embodiment, the blooming perfume composition of the present invention comprises at least about 3 different blooming perfume ingredients, alternatively at least about 5 different blooming perfume ingredients, alternatively at least about 6 different blooming perfume ingredients, alternatively at least about 10 different blooming perfume ingredients, alternatively 20 different blooming perfume ingredients.

In another embodiment, the perfume comprises enduring perfume ingredients that have a boiling point of about 250° C. or higher and a ClogP of about 3.0 or higher, alternatively at a level of at least about 25%, by weight of the perfume.

Suitable perfumes, perfume ingredients, and perfume carriers are described in U.S. Pat. No. 5,500,138; and U.S. patent application No. 2002/0035053 A1.

In the perfume art, some materials having no odor or very faint odor are used as diluents or extenders. Non-limiting examples of these materials are dipropylene glycol, diethyl phthalate, triethyl citrate, isopropyl myristate, and benzyl benzoate. These materials are used for, e.g., diluting and stabilizing some other perfume ingredients. For purposes of this invention, these materials are not counted as a "blooming perfume ingredient."

2. Perfume Pro-fragrances (Pro-perfumes)

The perfume active may also include pro-fragrances such as acetal profragrances, ketal pro-fragrances, ester pro-fragrances (e.g., digeranyl succinate), hydrolyzable inorganic-organic pro-fragrances, and mixtures thereof These pro-fragrances may release the perfume material as a result of simple hydrolysis, or may be pH-change-triggered pro-fragrances (e.g. pH drop) or may be enzymatically releasable pro-fragrances, or even released by exposure to light (photo pro-perfumes).

Pro-fragrances are suitably described in the following: U.S. Pat. No. 5,378,468 Suffis et al., issued Jan. 3, 1995; U.S. Pat. No. 5,626,852 Suffis et al., issued May 6, 1997; U.S. Pat. No. 5,710,122 Sivik et al., issued Jan. 20, 1998; U.S. Pat. No. 5,716,918 Sivik et al., issued Feb. 10, 1998; U.S. Pat. No. 5,721,202 Waite et al., issued Feb. 24, 1998; U.S. Pat. No. 5,744,435 Hartman et al., issued Apr. 25, 1998; U.S. Pat. No. 5,756,827 Sivik, issued May 26, 1998; U.S. Pat. No. 5,830,835 Severns et al., issued Nov. 3, 1998; and U.S. Pat. No. 5,919,752 Morelli et al., issued Jul. 6, 1999 all of which are incorporated herein by reference.

The perfume components may also be complexed with a polymer such as is described in WO 00/02986 published Jan. 20, 2000, Busch et al., and WO 01/04248 published Jan. 18, 2001, Busch et al. both of which are incorporated herein by reference. As described therein, the perfume is complexed in an amine reaction product that is a product of reaction between a compound containing a primary and/or secondary amine functional group and a perfume active ketone or aldehyde containing component, so called hereinafter "amine reaction product". The general structure for the primary amine compound of the invention is as follows:

$$B—(NH_2)_n$$

wherein B is a carrier material, and n is an index of value of at least 1. Suitable B carriers are inorganic or organic carriers, "inorganic" meaning a carrier that has non- or substantially non-carbon based backbones. Compounds containing a secondary amine group have a structure similar to the above excepted that the compound comprises one or more —NH— groups instead of —$NH_2$.

Suitable primary and/or secondary amines, among the inorganic carriers, are those selected from mono or polymers or organic-organosilicon copolymers of amino derivatized organo silane, siloxane, silazane, alumane, aluminum siloxane, or aluminum silicate compounds. Typical examples of such carriers are: organosiloxanes with at least one primary amine moiety like the diaminoalkylsiloxane [H2NCH2(CH3) 2Si]O, or the organoaminosilane (C6H5) 3SiNH2 described in: Chemistry and Technology of Silicone, W. Noll, Academic Press Inc. 1998, London, pp 209, 106).

Additional suitable primary and/or secondary amines, among the organic carriers, are those selected from aminoaryl derivatives, polyamines, amino acids and derivatives thereof, substituted amines and amides, glucamines, dendrimers, polyvinylamines and derivatives thereof, and/or copolymer thereof, alkylene polyamine, polyaminoacid and copolymer thereof, cross-linked polyaminoacids, amino substituted polyvinylalcohol, polyoxyethylene bis amine or bis aminoalkyl, aminoalkyl piperazine and derivatives thereof, bis (amino alkyl) alkyl diamine linear or branched, and mixtures thereof. A typical disclosure of amine reaction product suitable for use herein can be found in recently filed applications EP 98870227.0, EP 98870226.2, EP 99870026.4, and EP 99870025.6, all incorporated herein by reference.

Further suitable perfume materials and perfume complexes are disclosed in U.S. Pat. No. 7,056,877 B2 and U.S. Pat. No. 6,958,313 B2 and are hereby included by reference.

3. Formaldehyde Scavengers

In one aspect, the perfume microcapsules may be combined with a formaldehyde scavenger. Suitable formaldehyde scavengers include materials selected from the group consisting of sodium bisulfite, urea, ethylene urea, trimethylene urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly (vinyl alcohol), partially hydrolyzed poly(vinylformamide), poly(vinyl amine), poly(ethylene imine), poly(oxyalkylene-amine), poly(vinyl alcohol)-co-poly(vinyl amine), poly(4-aminostyrene), poly(1-lysine), chitosan, hexane diol, ethylenediamine-N,N'-bisacetoacetamide, N-(2-ethylhexyl) acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, N,N'-bis(3-aminopropyl)-1,2-diaminoethane, ammonium hydroxide, benzylamine, hydroxycitronellol, cyclohexanone, 2-butanone, pentane dione, dehydroacetic acid, or a mixture thereof. These formaldehyde scavengers may be obtained from Sigma/Aldrich/Fluka of St. Louis, Mo. U.S.A. or PolySciences, Inc. of Warrington, Pa. U.S.A.

Such formaldehyde scavengers are typically combined with a slurry containing said perfume microcapsules, at a level, based on total slurry weight, of from about 0.01 wt. % to about 18 wt. %, from about 0.1 wt. % to about 14 wt. % or even from about 5 wt. % to about 13 wt. %. One or more formaldehyde scavengers can be combined with a slurry containing said perfume microcapsules. Suitable formaldehyde scavengers are ethyl acetoacetate and acetoacetamide.

d. Other Functional Materials

1. Cleaning Actives

In one embodiment, the functional material comprises a cleaning active. Cleaning actives for use herein can include laundry cleaning actives, hard surface cleaning actives, hand or body soap cleaning actives, etc. Suitable cleaning actives include, but are not limited to, substances such as detersive surfactants (anionic, nonionic, cationic, zwitterionic, and amphoteric surfactants, and soaps), builders (inorganic and organic builder substances), bleaches, bleach activators, bleach stabilizers, bleach catalysts, enzymes, soil suspending or dispersing polymers, chelants, or combinations thereof, without the term being restricted to these substance groups. In one embodiment, the term "cleaning active" may be free or substantially free of one or more of the above identified actives. In one embodiment, the functionalized substrate comprises an encapsulated cleaning active and/or a free or unencapsulated cleaning active. In one embodiment, the cleaning active comprises a loading level as defined above.

Barrier agents perform a protective function. For example, they can protect mutually incompatible cleaning actives from one another, cleaning actives or solubility modifiers from the outside environment, the film from the external environment, etc. They can also modify the feeling at touch of the film and/or functional materials. They can make substrates more pleasant to the touch. Suitable barrier agents may include zeolite, bentonite, talc, mica, kaolin, silica, clay, hydrocarbons, silicone, starch, cyclodextrin, varnish, shellac, lacquer, polyolefins, paraffins, waxes, polyacrylates, polyurethanes, PVA, polyvinyl acetate, UV absorbers ( see e.g., McCutcheon's Volume 2, Functional Materials, North American Edition, published by the Manufacturing Confectioner Publishing Company (1997)), fluorescent dyes, (see e.g., EP 1,141, 207, U.S. Pat. No. 5,082,578), or combinations thereof.

In one embodiment, the functional composition may comprise one or more of the following material(s): soil release polymer, anti-oxidants, colorants, preservatives, optical brighteners, opacifiers, stabilizers such as guar gum and polyethylene glycol, anti-shrinkage agents, anti-wrinkle agents, soil release agents, fabric crisping agents, reductive agents, spotting agents, germicides, fungicides, anti-corrosion agents, antifoam agents, hueing dyes, and the like. In one embodiment, the functional composition is free or substantially free of any one or more of the above-identified optional components.

In another embodiment the functionalized substrate comprises an aesthetic agent. The aesthetic agent can have ornamental purposes and can denote the presence of functional materials on the film. It can also signal when a functional material is released or a product "end of life" via a change in color and/or appearance/disappearance of graphics, patterns, trademarks, etc.

2. Fabric Softening Actives

In one embodiment of the invention, the functional material comprises a fabric softening active. Such fabric softening actives are those effective in a "wash-added" (verses a rinse-added) context, although the use of quaternary ammonium compounds are not excluded as functional materials from this invention. Non-limiting examples include silicone, fatty acids, fatty esters, polyglycerol esters, polyethylene waxes, sucrose esters, clays, triglycerides, cationic starches, and cationic polymers. Coacervates with silicone and other softening actives in these co-pending Pat. Appl.s are included by reference: U.S. 2005/0020476 A1 and U.S. 2006/0217288 A1. In one embodiment, the fabric softening active is not encapsulated by the microcapsule. In another embodiment, the functionalized substrate is free or substantially free of a fabric softening active. Additional suitable fabric softening actives are disclosed in U.S. 2006/0058214 A1.

3. Deposition Agents

In one embodiment, the functional material comprises a deposition agent including, but not limited to I) non-quaternary materials that are (a) acyclic polymers or copolymers having nitrogen moieties in the backbone or in the pendant groups, or (b) vinyl polymers or copolymers having nitrogen heterocyclics in the pendant groups; II) non-polysaccharide polyquaterniums and other polymeric cationic quaternary materials; and mixtures thereof, and III) polysaccharide polyquaternium materials other polymeric cationic quaternary materials; and mixtures thereof.

The deposition agents suitable for use herein are polymeric materials having a weight average molecular weight generally in the range from about 1000 Da to about 3,000,000 Da, alternatively from about 2,500 Da to about 2,000,000 Da, alternatively from about 5000 Da to about 500,000 Da, alternatively from about 10,000 Da to about 200,000 Da. In one embodiment, the deposition aid is polyacrylamide or derivatives thereof, comprising a weight average molecular weight from about 1,000,000 Da to about 15,000,000 Da. In another embodiment, the deposition agent is a copolymer of poly (vinyl alcohol) and poly(vinyl amine), the weight average molecular weight from about 10,000 Da to about 400,000 Da.

When present, each deposition agent comprises, based on total composition weight, from about 0.01% to about 20%, alternatively from about 0.1% to about 15%, alternatively from about 0.2% to about 10 wt %, and alternatively from about 0.5% to about 5%.

Examples of suitable deposition agents are acyclic polymers or copolymers derived from monomers having nitrogen moieties, including but not limited to, amine, imine, amide, imide, acrylamide, methacrylamide, amino acid, and mixtures thereof. Additional suitable deposition agents are disclosed in U.S. Pat. No. 6,998,381, U.S. Pat. Publ. No. 2006/0058214 A1, and U.S. patent application Ser. No. 60/921,371.

4. Cationic Polymers

As used herein, cationic polymer includes any polymer (including in one embodiment, a cationic surfactant) which has a cationic charge. Some cationic polymers can function as deposition agents as described in the previous section; or alternatively, provide fabric care benefits on their own such as antiabrasion effects to improve the appearance of colored fabrics.

The functional composition herein can contain from about 0.001% to about 20%, alternatively from about 0.01% to about 5%, alternatively from about 0.1% to about 2%, of cationic polymer, typically having a molecular weight of from about 500 Da to about 5,000,000 Da (although some cationic starches can be as high as 10,000,000 Da in molecular weight), alternatively from about 1,000 Da to about 2,000,000 Da, alternatively from about 1,000 to about 1,000,000 Da, and alternatively from about 2,000 Da to about 500,000 Da and a charge density of at least about 0.01 milliequivalents/gram (meq/g), and up to about 23 meq/gm., alternatively from about 0.05 to about 8 meq/gm., alternatively from about 0.08 to about 7 meq/gm., and even alternatively from about 0.1 to about 3 milliequivalents/gram (meq/gm).

Non-limiting examples of cationic polymers include those disclosed in U.S. patent application Ser. No. 11/800,616 pages 19-18. In one embodiment, the functional composition is free or substantially free of cationic polymer.

5. Cationic Starches

In one embodiment, the functional material comprises a cationic polymer comprising a cationic polysaccharide. In another embodiment, the cationic polysaccharide comprises a cationic starch. The terms "polysaccharide" and "cationic starch" are used herein in the broadest sense. A cationic starch can also be used as a fabric care active, e.g., for softness and conditioning. Non-limiting examples of cationic starches are disclosed in U.S. Pat. Pub. 2004/0204337 and U.S. Ser. No. 11/712,173.

3. Adjunct Compositions a. Free Perfume

In one embodiment, the functionalized substrate comprising said encapsulated functional material further comprises a free perfume. The free perfume can be any perfume disclosed herein. As used herein, a free perfume is distinguished from any perfume encapsulated within a microcapsule in that the free perfume is not encapsulated and is instead incorporated within the functionalized substrate.

b. Viscosity/Hydrophobicity Modifiers

In one embodiment the functionalized substrate containing perfume microcapsules further comprises modifiers including viscosity or hydrophobicity modifiers. In one embodiment, the modifiers are minimized. Typical viscosity modifiers include, but not limited to, silicone oil, gums, and waxes. Typical hydrophobic modifiers include, but not limited to, isopropyl myristate, mineral oil, dipropylenemethyl ether (DPM). Such modifiers may be used at less than 50%, alternatively less than 40%, alternatively less than 30%, alternatively less than 20%, alternatively less than 10%, alternatively less than 5%, alternatively less than 1%, alternatively about 0%, alternatively at least 0.1% but not greater than 50%, by weight of total perfume composition in the perfume microcapsule. Without wishing to be bound by theory, the overuse of modifiers reduces the efficiency of the scent experience imparted by the PMCs of the present invention.

c. Solubility Modifiers

In one embodiment, the functional substrate further comprises a solubility modifier. Solubility modifiers are substances which modify the solubility of the film and/or functional materials by for example delaying or accelerating its solubility or making solubility dependent on external factors such as pH, temperature, ionic strength, redox potential, surfactant concentration, etc. One example of a solubility modifier is an amino-acetylated polysaccharide, having a selected degree of acetylation. Other suitable solubility modifiers may include the polymers described in US 2003/0158072 A1, whose water solubility may be triggered by changes in pH, salt concentration, concentration of surfactant, ionic strength, or combinations. The polymer is a copolymer or terpolymer containing from 2 to 60 mole % of a protonated amine functionality which has been neutralized with a fatty acid. WO 02/26928 provides non-limiting examples of suitable composite polymers that can be used for controlled release purposes, as in laundry.

Additional suitable solubility modifiers that are soluble in a given pH range are based on methacrylic acid co-polymers, styrene hydroxystyrene co-polymers, acrylate co-polymers, polyethylene glycol polyvinyl acetate, diethylphtalate, dioctyl sodium sulfocuccinate, poly-dl-lactide-co-glycolide (PLG), vinylpyridine/styrene co-polymers.

Solubility modifiers that are soluble in a specific chemistry environment are also commercially available. For instance caustic soluble barrier agents are commercially available from Alcoa under the trade name Hydra-Coat-5. Water dispersible barrier agents are based on sodium starch glycolate, polyplasdone and are commercially available from FMC Corporation under the trade name Ac-di-sol, from Edward Mendell Corporation under the trade name Explotab, from ISP under the trade name Crospovidone.

d. Structurant

In another embodiment, the functional substrate further comprises a structurant. Without intending to be bound by theory, it is believed that addition of a structurant helps the suspension of the microcapsules within the functionalized substrate. Acceptable for use herein are polymeric structurants selected from the group consisting of polyacrylates and derivatives thereof; polysaccharides and derivatives thereof; polymer gums and combinations thereof. Polyacrylate-type structurants comprise in particular polyacrylate polymers and copolymers of acrylate and methacrylate. An example of a suitable polyacrylate type structurant is Carbopol Aqua 30 available from B.F. Goodrich Company. Examples of polymeric gums which may be used as structurant herein can be characterized as marine plant, terrestrial plant, microbial polysaccharides and polysaccharide derivatives. Examples of marine plant gums include agar, alginates, carrageenan and furcellaran. Examples of terrestrial plant gums include guar gum, gum arable, gum tragacenth, karaya gum, locust bean gum and pectin. Examples of microbial polysaccharides include dextrin, gellan gum, rhamsan gum, welan gum and xanthan gum. Examples of polysaccharide derivatives include carboxymethyl cellulose, methyl hydroxypropyl cellulose, hydroxy propyl cellulose, hydroxyethyl cellulose, propylene glycol alginate and hydroxypropyl guar. The second structurant is selected from the above list or a combination thereof. Acceptable polymeric gums include pectin, alginate, arabinogalactan (gum Arabic), carrageenan, gellan gum, xanthan gum, Diutan® gum (ex. CP Kelco), and guar gum. If polymeric gum structurant is employed herein, an acceptable material of this type is gellan gum. Gellan gum is a tetrasaccharide repeat unit, containing glucose, glucurronic acid, glucose and rhamrose residues and is prepared by fermentation of Pseudomonaselodea ATCC 31461. Gellan gum is commercially marketed by CP Kelco U.S., Inc. under the KELCOGEL tradename.

In yet another embodiment, the functionalized substrate further comprises a plasticizer, for example glycerol, dipropylene glycol, ethylene glycol, diethyleneglycol, propylene glycol, sorbitol and mixtures thereof. Other useful additives include disintegrating aids.

e. Additional Adjunct Ingredients

In another embodiment, the functionalized substrate further comprises additional adjunct ingredients. These additional adjunct ingredients can act as processing aids and modify film properties such as film solubility and rate of dissolution, film dissolution stability, resistance to moisture pickup from humidity in storage, stretchability, feel, brittleness, and texture of the film, film appearance and shine, and ease and speed of processing the film, casting, extruding, or drying the film, mechanical handling of the film, and storage of the film. The film-forming polymers (for example, PVA with or without copolymers) may be further modified with various reagents commonly employed in the film preparation art such as plasticizers, surfactants, emulsifiers, non-film forming polymers, anti-block agents, antifoamers, defoamers, biocides, perfumes, preservatives, colorants, opacifiers, pearlescing agents, fillers and bulking agents, air or nitrogen, and the like.

To help provide flexibility to the functionalized substrate a plasticizer may be included in the film-forming composition. The amount of plasticizer can range from about 0% to about 40%, alternatively from about 1% to about 20%, alternatively from about 2% to about 10%, by weight of the functionalized substrate. Suitable plasticizers include glycerin, urea, poly (alkylene glycols) such as ethylene glycol, trimethylene glycol, tetramethylene glycol, pentamethylene glycol, hexamethylene glycol, propylene glycol, diethylene glycol, and triethylene glycol, alkane diols such as 1,2 propanediol, 1,3 propanediol, 2,3-butanediol, 1,4-butanediol, 1,3-butanediol, 1,5-pentanediol, and 1,6 hexanediol; alkanolamines such as triethanolamine; alkanolamine acetates such as triethanolamine acetate; and alkanolacetamides such as ethanol acetamide, citric acid, sodium citrate, and other salts. Other non-limiting examples of solvents that can be used include ethanol, propanol, isopropanol, n-propanol, n-butanol, t-butanol, ethylene glycol, diethylene glycol, dipropylene glycol, 1,2,3-propanetriol, propylene carbonate, glycerin carbonate, ethylene carbonate, phenylethyl alcohol, 2-methyl 1,3-propanediol, hexylene glycol, sorbitol, polyethylene glycols, 1,2-hexanediol, 1,2-pentanediol, 1,2-butanediol, 1,4-cyclohexanedimethanol, pinacol, 2,4-dimethyl-2,4-pentanediol, 2,2,4-trimethyl-1,3-pentanediol (and ethoxylates), 2-ethyl-1, 3-hexanediol, phenoxyethanol (and ethoxylates), glycol ethers such as butyl carbitol and dipropylene glycol n-butyl ether, ester solvents such as dimethyl esters of adipic, glutaric, and succinic acids, hydrocarbons such as decane and dodecane, and mixtures thereof.

Representative of surfactants conventionally employed in the production of water-soluble films include water-soluble anionic surfactants such as carboxylate soaps, alkylarylsulfonates, alkanesulfonates, alpha-olefin sulfonates, fatty alcohol sulfates, and oxo-alcohol ether sulfates. See e.g. U.S. Pat. No. 3,634,260. One suitable anionic surfactant class comprises alkali metal salts of sulphated fatty alcohols containing about 10 to about 18 carbon atoms, such as sodium lauryl sulfate and sodium stearyl sulfate. Suitable nonionic surfactants include the alkylphenol ethoxylates, fatty or oxo-alcohol polyethylene glycol ethers, ethylene oxide-propylene oxide block copolymers, fatty alcohol polyglycol ethers and ethoxylated fatty alcohols. Amphoteric or cationic surfactants may also be used, such as the alkyl betaines (sulfonated or nonsulfonated), quaternary ammonium salts and amine oxides. The surfactants may be used in amounts normally effective to assist in dispersion of water-soluble polymers, such as about 1% to about 30% by weight of total functionalized substrate.

Antifoam agents include the silicone polymers and silica, and defoamers include tallow compounds.

Useful biocides comprise any of the many known materials having efficacy against bacteria and other degrading organisms but which are non-toxic to handlers and to mammals or persons in the environment of use. Such agents and the principles of selection are well known to those skilled in the art. Suitable biocides include quaternary ammonium salts such as alkyl (C8-C18) di (lower alkyl) benzylammonium chloride, dialkyldimethylammonium bromide, and 1,2 benzisothiazolinon-3-one (BIT).

Other useful additives include mica, ethylene glycol distearate, talc, zeolites, cyclodextrins, clays, polyethylene, dispersions of polyethylene waxes, starch and starch derivatives, and cellulose and cellulose derivatives.

Additional additives suitable for use herein include: plasticizers, lubricants, release agents, fillers, extenders, antiblocking agents, detackifying agents, antifoams, and other ingredients as disclosed in U.S. Pat. No. 6,787,512 at col. 6, line 25-col. 7, line 25.

f. Water Content

In one embodiment, the functionalized substrate further comprises from about zero % to about 25% by weight of said functionalized substrate of free water and/or bound water incorporated with the functionalized substrate, alternatively from about 1% to about 15%, alternatively from about 2% to about 10%. Without intending to be bound by theory, it is believed that this water content can originate from either the composition susceptible to aqueous attack and/or from the process used to cast or form the functionalized substrate. It is further believed that this water content does not cause the functionalized substrate to dissolve any visibly noticeable degree within a time frame of about 180 days, alternatively 60 days, alternatively 30 days, without the addition of an aqueous solution.

g. Binder Materials

Binders, when used in the present invention are effective in the compositions at a level from about 0.001% to about 50%, alternatively from about 0.01% to about 20%, alternatively from about 0.02% to about 10%, alternatively from about 0.1% to about 5%. In one embodiment, the binder is at very low level, for instance from about 0.001% by weight to about 10%, alternatively from about 0.02% to about 2% by weight of the functionalized substrate. In another embodiment, the binder can be up at higher levels to about 20% or even as high as about 50% by weight. These higher levels are suitable if the binder comprises a cationic polymer which performs a dual function, for example, as a binder and a color maintenance agent. Non-limiting examples of suitable cationic polymers which can also function as color maintenance agents are disclosed in U.S. Pat. No. 7,056,877 to Caswell et al. col. 56-65.

The selection of a binder material to ensure the ability to form an article and the stability of the article. Any binder material known in the art can be used. In one embodiment, the binder material has a softening temperature above about 35° C., alternatively below about 200° C., and alternatively below about 100° C. The softening point is defined as the glass transition temperature, if one exists, or the melting temperature.

Suitable binders for use herein are those known to those skilled in the art and include anionic surfactants like C6-C20 alkyl or alkylaryl sulphonates or sulphates, alternatively C8-C20 alkylbenzene sulphonates, fatty acids, fatty alcohols, cellulose derivatives such as carboxymethylcellulose (CMC) and homo- or co-polymeric polycarboxylic acid or their salts, nonionic surfactants, alternatively C10-C20 alcohol ethoxylates containing from about 5-100 moles of ethylene oxide per mole of alcohol and alternatively the C15-C20 primary alcohol ethoxylates containing from about 20-100 moles of ethylene oxide per mole of alcohol. Of these tallow alcohol ethoxylated with 25 moles of ethylene oxide per mole of alcohol (TAE25) or 50 moles of ethylene oxide per mole of alcohol (TAE50) are suitable. Other suitable binders include the polymeric materials like polyvinylpyrrolidones with an average molecular weight of from about 12,000 to about 700,000 and polyethylene glycols with an average molecular weight of from about 600 to about 10,000. Copolymers of maleic anhydride with ethylene, methylvinyl ether, methacrylic acid or acrylic acid are other examples of polymeric binders. Others binders further include C10-C20 mono and diglycerol ethers as well as C10-C20 fatty acids.

In one embodiment the binders are polyethylene glycols with a softening temperature in the range of about 35° C. to about 65° C. One can also use water-soluble polymers, such as polyethyleneamines, polyethoxylated amines or imines, which have a softening temperature in the range of about 35° to about 65° C. A suitable polyethylene ethoxylated amine structure is shown below;

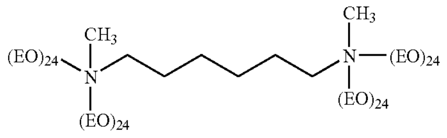

In one embodiment, the binder is a cationic polymer, including gums, such as polysaccharide gums, and synthetics. The cationic polymers of the present invention can be amine salts or quaternary ammonium salts. Suitable are quaternary ammonium salts. They include cationic derivatives of natural polymers such as some polysaccharide, gums, starch and certain cationic synthetic polymers such as polymers and copolymers of cationic vinyl pyridine or vinyl pyridinium halides. In one embodiment, the polymers are water-soluble, for instance to the extent of at least 0.5% by weight are soluble in water at 20° C. In another embodiment, the polymers have molecular weights (Daltons) of from about 500 to about 5,000,000, alternatively from about 1,000 to about 2,000,000, alternatively from about 1,000 to about 1,000,000, and alternatively from about 2,000 to about 500,000, and alternatively from about 2000 to about 100,000. As a general rule, the lower the molecular weight, the higher the degree of substitution (D.S.) by cationic, usually quaternary groups, which is desirable, or, correspondingly, the lower the degree of substitution, the higher the molecular weight which is desirable, but no precise relationship appears to exist. In general, the cationic polymers may have a charge density of at least about 0.01 meq/gm., alternatively from about 0.05 to about 8 meq/gm., alternatively from about 0.08 to about 7 meq/gm., and alternatively from about 0.1 to about 1 meq/gm. Cationic polymers are disclosed in U.S. Pat. No. 6,492,322 at column 6, line 65 to column 24, line 24. Other cationic polymers are disclosed in the CTFA "International Cosmetic Ingredient Dictionary and Handbook," Tenth Edition, Tara E. Gottschalck and Gerald N. McEwen, Jr., editors, published by The Cosmetic, Toiletry, and Fragrance Association, 2004. Still other cationic polymers are described at U.S. Patent Publ. 2003/0139312 A1, published Jul. 24, 2003, ¶¶317-347.

In one embodiment, the cationic polymer comprises a polysaccharide gum. Of the polysaccharide gums, guar and locust bean gums, which are galactomannam gums are available commercially, and are suitable. In another embodiment, the cationic polymer comprises cationic guar gum. Guar gums are marketed under Trade Names CSAA M/200, CSA 200/50 by Meyhall and Stein-Hall, and hydroxyalkylated guar gums are available from the same suppliers. Other polysaccharide gums commercially available include: Xanthan Gum; Ghatti Gum; Tamarind Gum; Gum Arabic; and Agar. Cationic guar gums under the Trade Name N-Hance are available from Aqualon.

Suitable cationic starches and derivatives are the natural starches such as those obtained from maize, wheat, barley etc., and from roots such as potato, tapioca etc., and dextrins, particularly the pyrodextrins such as British gum and white dextrin.

Suitable individual cationic polymers are the following: Polyvinyl pyridine, molecular weight about 40,000, with about 60% of the available pyridine nitrogens quaternized; copolymer of 70/30 molar proportions of vinyl pyridine/styrene, molecular weight about 43,000, with about 45% of the available pyridine nitrogens quaternized as above; copolymers of 60/40 molar proportions of vinyl pyridine/acrylamide, with about 35% of the available pyridine nitrogens quaternized as above; copolymers of 77/23 and 57/43 molar proportions of vinyl pyridine/methyl methacrylate, molecular weight about 43,000, with about 97% of the available pyridine nitrogens quaternized as above.

Some other cationic polymers include: copolymer of vinyl pyridine and N-vinyl pyrrolidone (63/37) with about 40% of the available pyridine nitrogens quaternized; copolymer of vinyl pyridine and acrylonitrile (60/40), quaternized as above; copolymer of N,N-dimethyl amino ethyl methacrylate and styrene (55/45) quaternized as above at about 75% of the available amino nitrogen atoms; and Eudragit E™ (Rohm GmbH) quaternized as above at about 75% of the available amino nitrogens. Eudragit E™ is believed to be copolymer of N,N-dialkyl amino alkyl methacrylate and a neutral acrylic acid ester, and to have molecular weight about 100,000 to 1,000,000. Another example of a cationic polymer includes a copolymer of N-vinyl pyrrolidone and N,N-diethyl amino methyl methacrylate (40/50), quaternized at about 50% of the available amino nitrogens. These cationic polymers can be prepared in a known manner by quaternizing the basic polymers.

Other useful cationic polymer examples include Magnafloc 370 (from Ciba Specialty Chemicals) also know by the CTFA name as Polyquaternium-6, as well as Polyquaternium-10 and Polyquaternium-24 (from Amerchol Corporation), and polyvinylamine also known as Lupamin (e.g., Lupamin 1595 and Lupamin 5095 from BASF). Magnafloc 370 has a relatively high charge density of about 6 meq/g. Lupamins can have molecular weights from about 10,000 to about 20,000 and a very high charge density of about 23 meq/g. Other examples of cationic polymers are chitosan, oligochitosan (suitable are materials with a molecular weight from about 500 to about 2,000,000, more alternatively from about 500 to about 50,000; a degree of acetylation of from about 70% and lower; and a polydispersity of from about 0 to about 10, alternatively from about 1 to about 3), chitosan derivatives, quaternized chitosan, and Syntahlen CR (Polyquaternium-37) available from 3V.

Further examples of cationic polymers include cationic polymeric salts such as quaternized polyethyleneimines. These have at least 10 repeating units, some or all being quaternized. Commercial examples of polymers of this class are also sold under the generic Trade Name Alcostat™ by Allied Colloids. Typical examples of cationic polymers are disclosed in U.S. Pat. No. 4,179,382 to Rudkin, et. al., column 5, line 23 through column 11, line 10. Each polyamine nitrogen whether primary, secondary or tertiary, is further defined as being a member of one of three general classes; simple substituted, quaternized or oxidized. The polymers are made neutral by water-soluble anions such as chlorine ($Cl^-$), bromine ($Br^-$), iodine ($I^-$) or any other negatively charged radical such as sulfate ($SO_4^{2-}$) and methosulfate ($CH_3SO_3^-$). Specific polyamine backbones are disclosed in U.S. Pat. Nos. 2,182,306; 3,033,746; 2,208,095; 2,806,839; 2,553,696. An example of modified polyamine cationic polymers of the present invention comprising PEI's comprising a PEI backbone wherein all substitutable nitrogens are modified by replacement of hydrogen with a polyoxyalkyleneoxy unit, $-(CH_2CH_2O)_7H$. Other suitable polyamine cationic polymers comprise this molecule which is then modified by subsequent oxidation of all oxidizable primary and secondary nitrogens to N-oxides and/or some backbone amine units are quaternized, e.g. with methyl groups.

Preferred cationic polymers include cationic guar gums and cationic cellulose polymers. The preferred cationic guar gums include the N-Hance® 3000 series from Aqualon (N-Hance® 3000, 3196, 3198, 3205, and 3215). These have a range of charge densities from about 0.07 to about 0.95 meq/gm. Another effective cationic guar gum is Jaguar C-13S. Cationic guar gums are a highly preferred group of cationic polymers in compositions according to the present invention and act both as scavengers for residual anionic surfactant (if used in the rinse cycle) and also add to the softening effect of cationic textile softeners even when used in baths containing little or no residual anionic surfactant. The other polysaccharide-based gums can be quaternized similarly and act substantially in the same way with varying degrees of effectiveness. Cationic guar gums and methods for making them are disclosed in British Pat. No. 1,136,842 and U.S. Pat. No. 4,031,307. Suitable cationic guar gums have a D.S. of from about 0.1 to about 0.5.

Cationic hydroxypropyl guars can also be use as cationic deposition aids. Useful examples include Jaguar C-162 and Jaguar C-2000 (ex. Rhodia).

Cationic cellulose polymers can also be used and another preferred class of materials. Included are "amphoteric" polymers of the present invention since they will also have a net cationic charge, i.e.; the total cationic charges on these polymers will exceed the total anionic charge. The degree of substitution of the cationic charge can be in the range of from about 0.01 (one cationic charge per 100 polymer repeating units) to about 1.00 (one cationic charge on every polymer repeating unit) and alternatively from about 0.01 to about 0.20. The positive charges could be on the backbone of the polymers or the side chains of polymers.

While there are many ways to calculate the charge density of cationic celluloses, the degree of substitution of the cationic charge can be simply calculated by the cationic charges per 100 glucose repeating units. One cationic charge per 100 glucose repeating units equals to 1% charge density of the cationic celluloses.

Preferred cationic celluloses for use herein include those which may or may not be hydrophobically-modified, having a molecular weight (Dalton) of from about 50,000 to about 2,000,000, alternatively from about 100,000 to about 1,000,000, and alternatively from about 200,000 to about 800,000. These cationic materials have repeating substituted anhydroglucose units that correspond to the general Structural Formula I as follows:

(I)

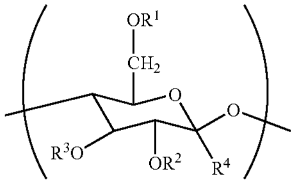

Alkyl substitution on the anhydroglucose rings of the polymer ranges from about 0.01% to about 5% per glucose unit, alternatively from about 0.05% to about 2% per glucose unit, of the polymeric material.

The cationic cellulose ethers of Structural Formula I likewise include those which are commercially available and further include materials which can be prepared by conventional chemical modification of commercially available materials. Commercially available cellulose ethers of the Structural Formula I type include the JR 30M, JR 400, JR 125, LR 400 and LK 400 polymers, all of which are marketed by Dow Chemical.

Another example of a cationic polymer is a cationic polysaccharide, such as starch, compound. The terms "polysaccharide" and "cationic starch" are used herein in the broadest sense. A cationic starch can also be used as a fabric care active, e.g., for softness and conditioning. Cationic starches are described in U.S. Pat. Pub. 2004/0204337 A1.

In one embodiment, the fabric care composition is free or essentially free of a cationic polymer.

In another embodiment, structurants that are typically suitable for use as thickening stabilizers can be selected as binders. These include gums and other similar polysaccharides, for example gellan gum, carrageenan gum, xanthan gum, Diutan gum (ex. CP Kelco) and other known types of thickeners and rheological additives such as Rheovis CDP (ex. Ciba Specialty Chemicals), Alcogum L-520 (ex. Alco Chemical), and Sepigel 305 (ex. SEPPIC).

Other preferred binders are uncharged, neutral polysaccharides, gums, celluloses, and polymers like polyvinyl alcohol, polyacrylamides, polyacrylates and co-polymers, and the like.

4. Functionalized Substrate Properties a. Microcapsule Distribution

In one embodiment, the plurality of microcapsules is incorporated with said functionalized substrate. In another embodiment, the plurality of microcapsules is dispersed throughout said functional substrate. As used herein, dispersed means that the microcapsules are present within the functional composition, including ordered and non-ordered dispersion patterns. In one embodiment, the plurality of microcapsules dispersed throughout said functional substrate is completely random. It has been found that one suitable method to incorporate said plurality of microcapsules with said functionalized substrate is to cast a slurry of microcapsules and the composition susceptible to aqueous attack together to form the functionalized substrate. In one embodiment, the plurality of microcapsules is uniformly dispersed throughout said functional substrate. In yet another embodiment, the functionalized substrate further comprises a plurality of microcapsules which are printed, laminated or coated onto the functional substrate. The microcapsules which are printed, laminated or coated onto the functional substrate can be the same or different from the plurality of microcapsules that is incorporated with said functional substrate.

In one embodiment, the plurality of microcapsules is localized to a discreet area or areas of the functionalized substrate, such as in a pattern or design; alternatively in random areas.

b. Volume Fraction

In one embodiment of the present invention, the functionalized substrate comprises a volume fraction of microcapsules to functionalized substrate from about 0.1 to about 0.8, alternatively from about 0.2 to about 0.7, alternatively from about 0.3 to about 0.6, alternatively from about 0.4 to about 0.5, as calculated by the volume fraction calculation defined herein.

Volume Fraction Calculation Method:

Dissolve the article in water or an aqueous solution until no particulate is visually detected. Filter water solution using a preweighed Grade No. 44 Quantitative Filter Paper (particle retention of down to 3 μm, available from Whatman in Florham Park, N.J.). Separate microcapsules from other insolubles in the filtrate by methods disclosed in the art. Let filter with microcapsules air dry to evaporate all the water and/or solvents. Weigh the dry filter paper to determine weight of microcapsules retained. Recover a small amount of the filtrated microcapsules and analyze using a particle sizer (examples are light microscopy and laser light scattering methods) and following manufacturer's instructions to obtain the mean particle diameter. Determine volume of average capsule ($V_{PMC}$). Assuming particle density equal to water, determine weight of an average capsule. Calculate the approximate number of capsules in filtrate ($N_{PMC}$). Use these values to calculate the volume fraction of capsules in the microcapsule containing article.

$$\phi_{PMC} = \frac{V_{PMC} \cdot N_{PMC}}{V_{article}}$$

Those of skill in the art will recognize that other methods of calculating volume fraction can be used without departing from the scope of the present invention.

c. Microcapsule Concentration

In one embodiment of the present invention, the functionalized substrate comprises a microcapsule concentration of from about $1\times10^6$ of microcapsules per 100 grams of said functionalized substrate to about $5\times10^{10}$ of microcapsules per 100 grams of said functionalized substrate, alternatively from about $1\times10^8$ of microcapsules per 100 grams of said functionalized substrate to about $1\times10^{10}$ of microcapsules per 100 grams of said functionalized substrate, alternatively from about $1\times10^9$ of microcapsules per 100 grams of said functionalized substrate to about $5\times10^9$ of microcapsules per 100 grams of said functionalized substrate.

d. Tensile Properties

In one embodiment of the present invention, the functionalized substrate comprises an elongation at break of from about 0 percent to about 800 percent, alternatively from about 1 percent to about 200 percent, alternatively from about 2 percent to about 50 percent. In another embodiment, the tensile stress at maximum load is from about 0.1 MPa to about 15 MPa, alternatively from about 1 MPa to about 5 MPa; alternatively from about 1.2 MPa to about 3 MPa.

e. Dissolution Rate in Aqueous Solution

As defined herein, dissolution rate means the rate at which the article dissolves when immersed in an aqueous solution. In one embodiment, the functionalized substrate comprises a rapid dissolution rate when said functionalized substrate is immersed in an aqueous solution at cold temperature, i.e. 40° F. or 50° F., and standard atmospheric pressure. As used herein, rapid dissolution means that the functionalized substrate dissolves at a rate of from about 0.1 grams/minute to about 1 grams/minute, alternatively from about 0.15 grams/minute to about 0.5 grams/minute, alternatively from about 0.2 grams/minute to about 0.3 grams/minute. In another embodiment, the dissolution rate of the functionalized substrate is such that when the functionalized substrate is immersed into an aqueous solution during the wash and/or rinse cycles using a conventional washing machine, the functionalized substrate dissolves prior to the completion of the wash and/or rinse cycle.

Dissolution rate can be determined according to the Dissolution Rate Determination Method described herein in the Examples.

f. Prolonged Dispersal in Ambient Air

As defined herein, prolonged dispersal meaning in ambient air means that the functionalized substrates according to the present invention are capable of dispersing the functional composition (e.g. perfume) for at least about 180 days, alternatively at least about 120 days, alternatively at least about 60 days, alternatively at least about 30 days, alternatively at least about 14 days, alternatively at least about 7 days. Without intending to be bound by theory, it is believed that although water and/or moisture facilitate the release of the functional composition, the functionalized compositions can also be released by an applied force rupturing the microcapsules and/or diffusion of the functional composition into and through the composition susceptible to aqueous attack.

Prolonged dispersal of perfume into ambient air can be measured by placing a sample in an enclosed room having a volume of from 10 to 200 cubic meters wherein a tester having normosmia (normal sense of smell) enters the room on a daily interval and is capable of detecting the presence of perfume when the sample is within arm's length or about two feet from the tester's nose.

One method to determine the prolonged dispersal of the functional composition in ambient air includes Headspace Gas Chromatography method adapted from the method that is described in WO07/78782A1. The headspace gas chromatography (HSGC) is capable of determining the amount of each perfume raw material that is released from the functionalized substrate over time. A suitable equipment is described by S. Maeno and P. A. Rodriguez in J. Chromatography, vol. A731 (1996) pages 201-215.

A sample of functionalized substrate is placed in the headspace collector and allowed to equilibrate for several hours. The trap is operatively connected to the headspace collector to capture the equilibrated headspace vapors. The transfer device is used to transfer the trapped headspace vapors, which contains perfume raw materials, onto a GC for quantitative analysis.

The functionalized substrate sample is kept in the headspace collector with a constant flow of helium and the headspace is periodically collected (eg., once a week) and measured to characterize the perfume in the headspace over time.

g. Basis Weight

In one embodiment, the functionalized substrate comprises a basis weight. Where the functionalized substrate comprises a film, the functionalized substrate has a basis weight from about 25 $g/m^2$ to about 300 $g/m^2$, alternatively from about 100 $g/m^2$ to about 250 $g/m^2$.

h. Substrate Volume

In one embodiment, the functionalized substrate comprises a volume of from about 0.1 $mm^3$ to about 10,000 $mm^3$, alternatively from about 0.2 $mm^3$ to about 5,000 $mm^3$, alternatively from about 0.3 $mm^3$ to about 1000 $mm^3$. (Note: $mm^3$ means millimeters cubed).

5. Forms of the Functionalized Substrate

In one embodiment, the functionalized substrate is in any form which can be used to administer the article into the wash and/or rinse cycles in a conventional washing machine. Examples of suitable forms include: a film, a powder, a powder slurry, a solid, a bar, a foam, an air-stable foam, a laminated film, a liquid, a mousse, or a gel. In another embodiment, the functionalized substrate is in unit dose form including tablets, pouches, capsules, beads, and sachets.

In the laundry products embodiments of the present invention, the functionalized substrates can be used to separate functional materials from one another (in the case where certain functional materials are incompatible) as well as control the release (or timing of the release, for example, of release of different functional materials at different times) or relative amounts of certain functional materials. The functionalized substrates can comprise more than one functional material in a layer or a plurality of layers comprising a plurality of functional materials or discrete regions comprising different functional materials.

a. Film Dimensions

In one embodiment of the present invention, the functional substrate comprises a film. In one embodiment, the film comprises a laminar or substantially planar form or sheet. As defined herein, substantially planar means that the film is in the form of a generally flat sheet which can be bent, folded, or otherwise deformed but still has the general shape of a flat sheet.

In one embodiment, the film comprising an average thickness of less than about 1 mm, alternatively less than about 0.5 mm, alternatively less than about 0.15 mm, alternatively less than about 0.1 mm, alternatively less than about 0.05 mm, alternatively less than about 0.04 mm, alternatively greater than about 0.01 mm. In one embodiment, the average thickness of the functionalized substrate comprises from about 0.025 mm to about 0.260 mm, alternatively from about 0.060 mm to about 0.200 mm. In one embodiment, the functionalized substrate comprises a 3D shape other than a film. The thickness of a 3D shape can vary from about 1 mm to about 5 cm or even 10 cm. For example, a spherical bead or ball could be from about 0.5 cm to about 5 cm in diameter. Other 3D shapes include rose flowers, berry shapes and various pasta shapes.

FIG. 1 provides a drawing of a suitable shape for a functionalized substrate in accordance with the present invention. In this embodiment, the functionalized substrate, (10) is in the shape of a tear drop or petal shape having a length, (20) at longest point of about 10 cm; a width, (30) perpendicular to said length at widest point of about 7 cm; an average thickness (not shown) of about 0.2 mm, and a planar area of from about 40 $cm^2$ to about 48 $cm^2$.

In another embodiment, the functionalized substrate comprises wafers, foams, sponges, bars, noodle and pasta shapes, or other three dimensional forms. In these cases, the average thickness of the functionalized substrate can be greater, even up to about 10 centimeters; alternatively less than about 1 cm; alternatively less than about 0.5 cm.

Without intending to be bound by theory, it is believed that thicker substrates generally take more time to dissolve in aqueous solution than thinner ones. Although delayed release of perfumes is generally desired, the functionalized substrate cannot take so long dissolve as to stain laundry. In one embodiment, the functionalized substrate when placed in a load of laundry completely dissolves within the time frame of the laundry wash cycle (irrespective of water temperature), alternatively within about 10 min, alternatively about 5 min, alternatively about 2.5 min at about 40° F. In another embodiment, the functionalized substrate when placed in a load of laundry completely dissolves within the time frame of the laundry rinse cycle (irrespective of water temperature).

In one embodiment, the functionalized substrate is cut into or prepared in the form of small pieces, having, in one embodiment, a maximum linear dimension of from about 0.2 mm to about 100 mm, alternatively from about 0.5 mm to about 50 mm, and alternatively from about 1 to about 20 mm, as a stand alone product or as part of another product. In another embodiment, the functionalized substrate comprises a planar area of from about 0.03 $mm^2$ to about 40,000 $mm^2$, alternatively from about 0.01 $mm^2$ to about 8,000 $mm^2$, alternatively from about 1 $mm^2$ to about 5000 $mm^2$. (Note: $mm^2$ means millimeters squared). This planar area is the area of a projection of the substrate. In another embodiment, the volume to surface area ratio of the functionalized substrate is from about 0.02 mm to about 20 mm, alternatively, from about 0.1 mm to about 10 mm.

The substrate may be cut or prepared into "confetti" that is added or incorporated as part of the powder, liquid or gel compositions. In another embodiment, the functionalized substrate is cut or formed into a shape which resembles, including but not limited to: flowers, flower petals, or leaves. Another embodiment can be in the form of a strip of film on a roll to dispense like tape with perforations to allow separation of segments of film. In one embodiment, the roll of film can be contained in a separate container or in a compartment of the closure; for example the closure of a bottle of liquid fabric conditioner and/or a liquid detergent product. Functionalized substrates are an effective way of protecting sensitive ingredients. In order to provide additional protection, the cutting operation can performed such that no functional materials are potentially exposed on the edge of the cut pieces. This is particularly advantageous when the functionalized cut pieces are introduced in a product in liquid/gel form that can potentially react with the functional material exposed on the edge of the cut pieces.

In one embodiment, where the film is cut into pieces weighing from about 1 milligram, alternatively from about 0.1 grams, alternatively from about 1 gram to about 5 grams, alternatively to about 3 grams, alternatively to about 2 grams. In another embodiment, the film is cut of shredded into very small pieces from about 0.05 mm to about 5 mm in its longest dimensional length. In yet another embodiment, the film pieces appear as confetti with either the same color or multicolors and with either about the same size or a variety of sizes.

In one embodiment, small pieces of the substrate are incorporated as part of a laundry detergent product or a laundry additive product (e.g., dry, liquid or other form). Alternatively, small pieces of the substrate are incorporated as part of a liquid, rinse-added, fabric softening product. The small pieces may be substantially uniformly distributed throughout the composition of the product. The small pieces may be of different sizes, colors, and shapes to distinguish different benefits delivered. The use of structurants or thickening agents in the composition is one way of keeping the small pieces of substrate suspended, substantially uniformly distributed throughout the composition. In one embodiment the liquid laundry detergent product and/or the liquid fabric softening product is clear or translucent. The clear or translucent liquid allows the small pieces of the substrate to be more highly visible. The laundry compositions may be contained in a multiple unit dose container (e.g., bottle) or single unit container that is clear, substantially clear, translucent, or substantially translucent, to showcase the small pieces in the composition to the user. The laundry composition may consist of 2 or more phases and the substrate pieces may be distributed in either one, several, or all of the phases, In one embodiment, at least 10%, alternatively at least 20%, alternatively at least 30%, alternatively at least 40%, alternatively at least 50%, alternatively at least 75%, alternatively at least 90%, of the surface area of the container is clear, substantially clear, translucent, or substantially translucent; but alternatively not greater than 99.9%. Such materials include polyethylene terephthalate (i.e., PET, PETE, or PETP). The small pieces may be of uniform or substantially uniform shapes or size or may be different based upon product design. Small pieces may be in the shape of squares, triangles, rectangles, circles, spherical beads, or other geometric shapes, or completely random, or combinations thereof. The small pieces each may have same color or a different color.

b. Substrate Layering

In one embodiment, the functionalized substrate comprises a single layer substrate. In one embodiment, the film comprises a multi-layer substrate. Where the film comprises multi-layers, the composition of a first layer of film is different than the composition of a second layer of film. In another embodiment, the functional material of a first layer of film is different than the functional material of a second layer of film. Examples of different functional materials can include embodiments where the first functional material comprises a first PMC and the second functional material can be a functional material other than PMC or a second PMC, wherein the encapsulated perfume components are different. These different encapsulated perfumes components can have different chemical formulas or create different scent effects. In another embodiment, the present invention comprises more than two layers, wherein each layer comprises a functional material, and wherein at least two of the layers have different functional materials. Suitable layering configurations are disclosed in U.S. patent application Ser. No. 11/800,616 at 26-27.

c. Foams

In one embodiment of the present invention, the functionalized substrate is in the form of a foam which is air-stable, but instable when contacted with water, i.e., dissolves in water. Suitable foam embodiments may be in a particle form of a sponge-like structure, used as a binder within the article or in sheet form to encapsulate or coat the article.

It has been found that when a specific foam component, comprising polymeric material and a functional composition according to the present invention is used, effective delivery of the active and protection of the active, not only against air-moisture and chemical reactions but also against physical forces, is achieved. The foam component is found to be air-stable under normal humidity storage conditions, but water-unstable (subject to aqueous attack) to thus deliver the actives, disintegrating or dissolving in water, to thus deliver the actives. Further, the foam may serve as a substrate for the active absorbing the active on its surface or adsorbing it into the cells of the foam. The functional actives can be in the form of a microcapsule or free active or both, and 2 or more actives can be used. In addition, the foam component can act as a binder providing structural integrity to the article. Further, the foam may be used as an outer coating to protect the article and prevent premature disintegration or dusting of the article.

The foam component is a stable flexible foam and is stable when in contact with air, yet unstable upon contact with water. The foam component releases the active ingredient or part thereof upon contact with water, with the foam component partially or completely disintegrating, dispersing, denaturing and/ or dissolving upon contact with water. In one embodiment, the foam component is in the form of particles that can be incorporated in compositions, or as a sheet, such that it can form a foam sheet that can be used as protective coating for the composition. In another embodiment, air or nitrogen bubbles can be intentionally introduced into the casting, extruding or film blowing process to create a foamed film sheet. This can alter the appearance of the foam and may improve the dissolution rate of the film in water (e.g., at 50° F. or less).

d. Other Forms

In one embodiment, the functionalized substrate further comprises a surfactant suitable for cosmetic use on skin or for cleaning of hard surfaces (such as dishes or floors) or skin. Suitable surfactants include soap, anionic surfactant, nonionic surfactant, amphoteric surfactant, zwitterionic, cationic surfactant and mixtures thereof. The functionalized substrate can further comprise a carrier material. Suitable carrier materials include soluble or partially soluble starches, water soluble amorphous solids or semi-crystalline water soluble solids, and mixtures thereof. In one embodiment, the carrier material is a polyethylene glycol. In another embodiment, the article comprises a surfactant suitable for cosmetic use on skin and a functionalized substrate comprising a carrier material and a functional material comprising a microcapsule encapsulating a perfume. Non-limiting examples of said carrier material is a starch or a starch derivative, soap, and combinations thereof. In one embodiment article further comprises: propylene glycol, sorbitol, glycerin, sodium laureth sulfate, sodium stearate, sodium myristate, sodium cocoyl isethionate, triethanolamine, water, and a perfume microcapsule.

e. Substrates comprising Unitized Doses

In one embodiment, the functionalized substrate comprises a unit dose cleaning or fabric conditioning product. It could be single or multi-compartment unit dose product, optionally a vacuum- or thermoformed multi-compartment water-soluble pouch, wherein one of the compartments, optionally containing a solid powder composition. Suitable methods for making unit dose executions are described in US 2005/0065051 A1; US 2005/0061703 A1. Single compartment pouches can be made by placing a first piece of film in a mould, drawing the film by vacuum means to form a pocket, filling the formed pocket with a fabric care active including the guest-host complex, and placing and sealing the formed pocket with another piece of film.

Multi-compartment pouches comprising a powder and a liquid composition can be made by placing a first piece of film in a mould, drawing the film by vacuum means to form a pocket, pinpricking the film, dosing and tamping the powder composition, placing a second piece of film over the first pocket to form a new pocket, filling the new pocket with the liquid composition, placing a piece of film over this liquid filled pocket and sealing the three films together to form the dual compartment pouch. Any functional material disclosed herein can also be contained within the single or multi-compartment pouch.

In another embodiment, the functionalized substrate comprises a unit dose fabric care product (such as pouches, capsules and sachets) either as part of the enveloping material or as part of the contents enclosed within the enveloping material. In one embodiment the enveloping material is formed at least in part of the functionalized substrate. For example, a single compartment unit dose form typically has separate bottom and top layers of enveloping material; according to this embodiment one or both layers can comprise or be composed of the functionalized substrate of the invention. The same is true for multi-compartment unit dose forms in which top, bottom and/or any of the intermediate layers of enveloping material can comprise or be composed of the functionalized substrate of the invention.

In another embodiment, the functionalized substrate comprises small pieces that appear as beads or confetti in the dry powder laundry detergent, dry powder fabric softener, dry powder bleach, dry powder hard surface cleaner, or a dry automatic dish washing powder or unit dose.

f. Coordinating Substrate Shape and Benefit

In one embodiment of the present invention, the functionalized substrate, in any of the above disclosed forms, comprises a shape, wherein the shape and the benefit and/or at least one functional material are coordinated. By shape, it is also meant that the form of the functionalized substrate can include any drawings, wording and/or colorations which can be placed on the functionalized substrate by any method known in the art. This includes scent and shape names as well as trademarks. As used herein, coordinated means any relationship between the shape and the consumer desired benefit and/or functional material, such that a consumer would understand that the shape represents the benefit (scent or other benefits) and/or the functional material or vice versa. In one embodiment where the plurality of microcapsules encapsulates a perfume and where the perfume provides a specific scent experience, the shape of the functionalized substrate is coordinated with the scent experience generated by the perfume.

Non-limiting examples of suitable coordinated shapes and scent experiences are disclosed in U.S. patent application Ser. No. 11/800616 at pages 29-30. Additional suitable coordinated shapes include: cactus flower, hibiscus, a flower, petal, tear drop, and/or a leaf 6. Methods of Using Articles a. Fabric Care Uses The functionalized substrates of the present invention have a multitude of applications and methods of use. One application for functional substrates described herein is in the field of fabric care. One method of dispensing an encapsulated perfume comprising: contacting a functionalized substrate according to the present invention with an aqueous solution; at least partially dissolving said functionalized substrate; thereby releasing at least one encapsulated functional material (e.g. perfume) from said functionalized substrate. In one embodiment, said aqueous medium is the wash and/or rinse water in the basin of an automatic or manual laundry washing machine. Another suitable method of use further comprises, wherein said step of contacting said article with an aqueous solution comprises at least partially immersing said article in said aqueous solution, such as from the wash cycle and/or a rinse cycle of a laundering process. Another suitable method of use provides for administering the functionalized substrate in the dryer. Yet another method of use is administering the functionalized substrates into a tub, basin, bucket or container in hand laundering situations, in the hand washing step, rinsing step or both.

In one embodiment where a laundry bath solution is prepared by dispensing one or more functionalized substrates into an aqueous solution (for pre-soak, wash and/or rinse cycle solutions prepared in an automated washing machine, manual washing device, tub or other container) the laundry bath solution comprises from about 0.1 ppm and about 500 ppm of the functional composition. Further, conventional detergent and/or fabric softener with perfume can also be used. In another embodiment, an unscented detergents and/or fabric softeners can be used.

Where the article is to be dispensed into a rinse bath solution, but dispensing is desired at the beginning of the wash cycle, the article or dose may be placed in dispensing means for delayed dispensing. Dispensing means will include the dispensing devices that are built into commercially available washing machines such as dispensing drawers and top loaded agitator dispensers. Likewise, the dispensing means will also include self-contained dispensing devices that may be placed in the tub of the machine at the start of the wash cycle (one example is the Downy® Ball). Suitable self-contained dispensing devices that are useful in the methods of the present invention are those that are designed to open during the spin cycle that follows the wash and precedes the rinse cycle. When a self-contained dispensing device is used to dispense an article or dose, water or a liquid fabric softening composition is also added to the dispenser to aid in the dissolution and dispensing of the fabric care composition, i.e. between about 5 ml and about 150 ml of water and/or liquid fabric softener is added to the self-contained device.

Functionalized substrates according to the present invention can be used to customize the user's scent experience when laundering fabrics and/or control the intensity of their scent experience during and/or after the laundering process. Suitable methods to customize the user scent experience are disclosed in U.S. patent application Ser. No. 11/800,616 at pages 37-39.

Further, methods of preparing a customized laundry solution include the use of a scented or unscented detergent and/or fabric softener composition. Because it is anticipated that consumers will want the opportunity to choose the fragrance that will be deposited on their fabrics, the present invention can be used with unscented detergents and/or fabric softeners. The optional detergent and/or fabric softening composition may be any detergent or fabric softener that is known in the art and may be unitized or a measured amount of a bulk composition.

The present invention allows users to design their own customized scent experience by blending two or more functionalized substrates where the substrates can contain different perfumes, with or without the additional usage of conventional laundry products. Additionally, the users can use one or more functionalized substrates in combination to select mixtures of desired benefits, such as using one or more functionalized substrates selected to provide a specific customized scent experience with one or more functionalized substrates selected to provide a non-scent benefit, such as softness, anti-static control, anti-wrinkle, fiber cleaning, fiber strengthening, anti-abrasion, dye fixation, dye transfer inhibition, pill reduction, etc.

The method of preparing a customized laundry solution optionally includes providing information to assist the consumer in selecting a fabric care composition, or an article or dose containing such a composition that will deliver a desired fabric care benefit. This information is provided in the form of instructions that may be used to guide the consumer as described herein in conjunction with the articles and laundry kits of the present invention.

b. Dish Washing Uses

Articles of the present invention may be designed for dosing into an automatic dish washing machine. Such articles can provide scent in the washing process (i.e., fragrance into the kitchen) and/or other functional benefits (such as cleaning from surfactants, bleaches, enzymes, solvents, soli dispersing polymers, chelants, and the like). Other functional benefits can be rinsing aids (to avoid water spotting) and antifoams (so higher levels of cleaning surfactants can be used). The benefit active agents can be in microcapsules, as well as free, or combinations thereof. The functionalize substrate can be added at the start of the washing cycle and dissolves and/or disperses in the pre-rinse cycle. Alternatively the functionalized substrate dissolves and/or disperses in the wash cycle or in the final rinse cycle.

c. Air Care Uses

A method of dispensing an encapsulated perfume comprising: contacting a functionalized substrate according to the present invention with an aqueous solution; at least partially dissolving or penetrating said functionalized substrate with water or moisture; and releasing at least one of the encapsulated perfume from said functionalized substrate. In one embodiment, the moisture is provided from ambient air (e.g. humidity); by bodily contact with man or beast; or from an article of clothing or fabric moistened by sweat from bodily contact (a sock, or shirt). Another suitable air care use provides for a step of applying a force onto said article, such as a mechanical force) comprising: tearing; pulling, twisting, compacting, folding; bending and otherwise deforming said functionalized substrate. It is believed that this applied force disrupts the plurality of microcapsules such at least a portion of said functional material is released into the air.

Additional uses related to releasing the functionalized substrate through the air include: providing said functionalized substrate as a shoe insert; providing said functionalized substrate as a liner, at least partially lining a portion of a plastic bag (e.g. garbage bag or grocery bag); providing said functionalized substrate in a pet bed or in cat litter; providing said functionalized substrate in an absorbent product such as a feminine pad or a garment worn by individuals who are unable to control their bladder or bowel movements, or who are unable to reach the toilet when needed (e.g. diaper or other sanitary garments); providing said functionalized substrate onto a door or car mat; embedding said functionalized substrate into a household cleaning sheet such as those used for Swiffer and or the Swiffer Carpet Flick by Procter & Gamble Company; providing said functionalized substrate as a confetti for dispersing onto carpet and/or floors prior to and/or after mopping and/or vacuuming; and providing said functionalized substrate as a packaging liner for food and/or product packages.

7. Processes for Article Manufacture

In one example a functionalized substrate comprising PEG can be used. A PMC slurry and molten PEG are mixed together to achieve a well dispersed and homogeneous mixture. The PEG 8000 has a melting point of about 75° C. The resulting mixture is then used as is, or alternatively, it is kept under partial vacuum to reduce the amount of water in the mixture before use. The mixture is poured into a casting mold, and the mixture solidifies at room temperature by cooling.

In another example a functionalized substrate comprising cellulose can be used. A PMC slurry is mixed together with fragments of a water dispersible paper (cellulose) as made and supplied by Mishima, Japan. The ratio of the PMC: cellulose is 1:0.05 on a weight basis. This resulted in water absorption by the cellulose and hence a thickened mixture. The mixture is poured into a mold and dried overnight at room temperature. The result is a handlable and flexible substrate. Alternatively, cellulose fibers are added along with a binder material such as CMC and mixed with the PMC slurry to produce an article after drying.

8. EXAMPLES a. Functionalized Substrate Comprising Cellulose

Table A

The following functionalized substrates are in accordance with the present invention.

| Ingredient | Comment | I grams | II grams | III grams |
|---|---|---|---|---|
| Cellulose fibers | Water disintegrating and/or water dispersing material | 7.96 | 7.66 | 7.84 |
| Glycerol | Humectant, texture and pliability enhancer | 3.98 | 0.00 | 0.00 |
| Guar Gum [a] | | 0.00 | 0.00 | 1.57 |
| Ethylmethyl Cellulose | | 0.00 | 7.66 | 3.92 |
| DI Water | | 15.93 | 15.32 | 15.68 |
| Perfume oil | Encapsulated Perfume | 49.72 | 47.81 | 48.94 |
| Urea/formaldehyde | PMC Capsule Wall | 8.79 | 8.46 | 8.66 |
| Ethyl Acetoacetate | Formaldehyde Scavenger | 6.79 | 6.53 | 6.68 |
| Acticide MBS [b] | Preservative | 0.02 | 0.02 | 0.02 |
| MgCl2 | | 6.67 | 6.42 | 6.57 |
| Xanthan gum | | 0.13 | 0.12 | 0.13 |
| TOTAL | | 100.00 | 100.00 | 100.00 |

[a] Terrestrial plant gum mainly consisting of high molecular weight (50,000-8,000,000) polysaccharides composed of galactomannans available from Sigma-Aldrich in St. Louis, Missouri.

[b] Microbiocide based on isothiazolinones available from Acti-Chem Specialties Inc. in Trumbull, Connecticut.

b. Functionalized Substrate Comprising PEG

Table B

The following functionalized substrates are in accordance with the present invention.

| Ingredient | comment | I grams | I grams | III grams |
|---|---|---|---|---|
| PEG | Water-soluble material, Partially water soluble material | 66.67 | 74.07 | 80.00 |
| Ethylmethyl Cellulose | | 0.00 | 1.23 | 0.00 |
| Perfume oil | EncapsulatedPerfume | 10.40 | 7.71 | 6.24 |

-continued

| Ingredient | comment | I grams | I grams | III grams |
|---|---|---|---|---|
| Urea/formaldehyde | PMC Capsule Wall | 1.84 | 1.36 | 1.10 |
| Ethyl Acetoacetate | Formaldehyde Scavenger | 1.42 | 1.05 | 0.85 |
| Acticide MBS [b] | Preservative | 0.01 | 0.00 | 0.00 |
| MgCl2 | | 1.40 | 1.03 | 0.84 |
| Xanthan gum | | 0.03 | 0.02 | 0.02 |
| DI Water | | 18.24 | 13.51 | 10.94 |
| TOTAL | | 100.00 | 100.00 | 100.00 |

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

All parts, ratios, and percentages herein, in the Specification, Examples, and Claims, are by weight and all numerical limits are used with the normal degree of accuracy afforded by the art, unless otherwise specified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the DETAILED DESCRIPTION OF THE INVENTION are, in the relevant part, incorporated herein by reference; the citation of any document is not to be construed as an admission that it is prior art with respect to the present invention. To the extent that any meaning or definition of a term or in this written document conflicts with any meaning or definition in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article comprising:

a. a functionalized substrate comprising:

i. from about 1% to about 20% by weight of said functionalized substrate, of a cellulose derivative selected from the group consisting of a hydroxypropylmethylcellulose phthalate, a hydroxypropylmethyycellulose acetate succinate, a carboxymethylethyl cellulose, a cellulose acetate trimellitate, a cellulose acetate phthalate, and mixtures thereof;

ii. from about 0.001% to about 50% by weight of said functionalized substrate, of a binder material; and iii. a plurality of microcapsules encapsulating at least one functional material, wherein said plurality of microcapsules is incorporated with said functionalized substrate; said functionalized substrate having a rate of dissolution in water of from about 0.1 to about 1 gram/minute at a temperature of 40° F.-50° F.

2. The article according to claim 1, wherein the weight ratio of said at least one functional material to said cellulose derivative of from about 1:0.05 to about 1:1.

3. The article according to claim 1, further comprising a weight ratio of said cellulose derivative to said binder material of from about 100:1 to about 1:1.

4. The article according to claim 1, wherein said binder material comprises carboxymethyl cellulose, a carboxymethyl cellulose derivative, a guar gum, a xanthan gum, and mixtures thereof.

5. The article according to claim 1, further comprising a water-soluble polymeric material.

6. The article according to claim 5, wherein said water-soluble polymeric material comprises: a polyvinyl alcohols, a modified PVA; a polyvinyl pyrrolidone; a polyvinylamine; a partially hydrolyzed polyvinyl acetate; a polyalkylene oxide; a polyethylene glycol; a acrylamide; a acrylic acid; a cellulose, an alkyl cellulosic; a polyvinyl acetate; a polycarboxylic acid; a polyaminoacid or peptide; a polyamides; a polyacrylamide; a copolymer of maleic/acrylic acid; a polysaccharides; and mixtures thereof.

7. The article according to claim 1, wherein said at least one functional material comprises a perfume.

* * * * *